(12) United States Patent
Matsuo et al.

(10) Patent No.: US 9,019,861 B2
(45) Date of Patent: Apr. 28, 2015

(54) BASE STATION AND COMMUNICATION SYSTEM

(75) Inventors: Hidenori Matsuo, Kanagawa (JP); Takahisa Aoyama, Kanagawa (JP); Keigo Aso, Kanagawa (JP); Shinkichi Ikeda, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 142 days.

(21) Appl. No.: 13/814,635

(22) PCT Filed: Jul. 29, 2011

(86) PCT No.: PCT/JP2011/004315
§ 371 (c)(1),
(2), (4) Date: Feb. 6, 2013

(87) PCT Pub. No.: WO2012/035697
PCT Pub. Date: Mar. 22, 2012

(65) Prior Publication Data
US 2013/0142070 A1 Jun. 6, 2013

(30) Foreign Application Priority Data

Sep. 17, 2010 (JP) .................................. 2010-209744
May 25, 2011 (JP) .................................. 2011-116498

(51) Int. Cl.
*H04W 40/02* (2009.01)
*H04W 40/12* (2009.01)
(Continued)

(52) U.S. Cl.
CPC .............. *H04W 40/02* (2013.01); *H04W 40/12* (2013.01); *H04W 76/022* (2013.01); *H04W 84/047* (2013.01); *H04W 88/16* (2013.01)

(58) Field of Classification Search
None
See application file for complete search history.

(56) References Cited

U.S. PATENT DOCUMENTS 8,194,669 B1 * 6/2012 Arye et al. .................... 370/392
2005/0094608 A1 5/2005 Yokota
(Continued)

FOREIGN PATENT DOCUMENTS

JP 2005-79720 A 3/2005
JP 2007-027957 A 2/2007
(Continued)

OTHER PUBLICATIONS

International Search Report for PCT/JP2011/004315 dated Nov. 1, 2011.

*Primary Examiner* — Chi H Pham
*Assistant Examiner* — Shick Hom
(74) *Attorney, Agent, or Firm* — Pearne & Gordon LLP

(57) ABSTRACT

Disclosed is a technique to provide a base station and the like capable of flexibly distributing traffic for terminals of a plurality of network-sharing communication operators. According to the technique, the base station to which a plurality of mobile terminals connect and that relays a communication between the plurality of mobile terminals and a communication device as a correspondent node of the plurality of mobile terminals, includes a configuration unit that configures, on a basis of policy information, a desired communication path between the mobile terminals and the communication device, a communication path from the base station itself to a gateway managing an access to a network to which the communication device belongs; and a storage unit that stores in a storage area, as association information, content of the policy information and identification information that identifies the communication path corresponding to the content.

12 Claims, 31 Drawing Sheets

(51) Int. Cl.
*H04W 76/02* (2009.01)
*H04W 84/04* (2009.01)
*H04W 88/16* (2009.01)

(56) References Cited

U.S. PATENT DOCUMENTS

2006/0203773 A1* 9/2006 Georges et al. ............... 370/329
2008/0256251 A1* 10/2008 Huotari et al. ................ 709/229
2010/0173586 A1* 7/2010 McHenry et al. ............... 455/62
2011/0183667 A1 7/2011 Tamura et al.

FOREIGN PATENT DOCUMENTS

| | | |
|---|---|---|
| JP | 2007-318719 A | 12/2007 |
| JP | 2009-514100 A | 4/2009 |
| JP | 2010-056905 A | 3/2010 |
| WO | 03/061323 A1 | 7/2003 |
| WO | 2007/050481 A2 | 5/2007 |

\* cited by examiner

FIG. 11

CORRESPONDING INFORMATION

| NECESSITY OF SIPTO | BEARER TYPES |
|---|---|
| SIPTO NOT REQUIRED | BEARER 1 |
| SIPTO REQUIRED | BEARER 2 |

FIG. 15

CORRESPONDING INFORMATION

| CONTENT | BEARER TYPES |
|---|---|
| NORMAL | BEARER 1 |
| FOR OP2 ONLY | BEARER 2 |

FIG. 17

CORRESPONDING INFORMATION

| QoS | BEARER TYPES |
|---|---|
| HIGH QoS | BEARER 1 |
| LOW QoS | BEARER 2 |

BASE STATION AND COMMUNICATION SYSTEM

TECHNICAL FIELD

The present invention relates to a base station that relays a communication between a mobile terminal and a correspondent node and a communication system including a mobile terminal and a base station.

BACKGROUND ART

A mobile relay (MR) as a relay base station (a relay) that moves is considered for a mobile communication technique, and to implement the mobile relay, various techniques are considered. One operation example of the mobile relay may be to introduce the mobile relay into public transportation such as a train and a bus. The mobile relay in this case has the following features. As a first feature, as shown in FIG. 30, since a plurality of terminals (terminal a, terminal b) connected to a mobile relay 3000, i.e., terminals of passengers on board, move with the vehicle, the mobile relay 3000 collectively manages mobile control such as a handover with macro base stations (Donor eNB: DeNB) 3001, 3002 to which the mobile relay 3000 connects during the ride. Thereby there is no need for each terminal itself to perform mobile control, and therefore traffic of signaling of terminals for the mobile control can be reduced. That is, since the mobile relay 3000 can collectively manage the plurality of terminals, signaling traffic to the macro base stations can be reduced. As a second feature, content and cache stored in the mobile relay or in a server provided in a vehicle such as a train with which the terminals move together are available, whereby the frequency of accesses outside the vehicle can be reduced and external traffic by the terminals can be reduced.

To implement this, the mobile relay establishes a bearer for data (U-plane) with a gateway (GW). This operation is similar to a typical 3G terminal (UE). Control information and user data of a terminal connecting to the mobile relay are both transmitted to the GW through the bearer for data of the mobile relay.

In order to provide wireless accesses on the train to all communication operators (hereinafter this may be simply called operators) in a mobile relay provided at public transportation, use of a wireless resource and a network, or network sharing to share a wireless resource among the communication operators may be considered (see the following Patent Document 1). Referring to FIG. 31, the network sharing using the mobile relay is described below by way of a system to share both of a wireless resource and a network. That is, 3G lines are used between a MR 3100 and operator (OP) terminals (UE: User Equipment) 3101, 3102 and between the MR 3100 and a DeNB 3103, and one operator network is shared among the MR 3100 and UEs 3101 and 3102, between the MR 3100 and the DeNB 3103 and between the DeNB 3103 and a core network (CN 3104). Herein, the sharing of a 3G line is implemented by incorporating information on a plurality of operators into notification information that the MR 3100 transmits. More specifically, a plurality of PLMN IDs that are IDs indicating operators are set. Thereby, when a terminal finds an operator to which the terminal subscribes from the plurality of PLMN IDs, the terminal determines that the terminal is in the network of the operator for selection.

PRIOR ART DOCUMENTS

Patent Documents

Patent Document 1: WO 2003/061323 (Abstract)

For network sharing, since terminals of a plurality of operators use a common network line and Entity, it is important to control the resources. This is because each operator requires the control so as to place priority on a user as a direct subscriber and lower the priority of a user subscribing to another operator. Even when network sharing is executed, since each operator to which a terminal belongs has a different network of the operator as a destination, a line may be divided for each operator at the network Entity on the way. Further, since a bearer is configured between MR-GW in the mobile relay system as stated above, a DeNB between the MR-GW cannot understand the state of the bearer. Therefore, it is impossible to control the traffic by dividing a line at the Entity on the way between MR-GW. For instance, the traffic cannot be distributed or a line cannot be divided for each operator.

SUMMARY OF THE INVENTION

In view of these problems, it is an object of the present invention to provide a base station and a communication system capable of flexibly controlling traffic for terminals of a plurality of network-sharing communication operators.

In order to achieve the aforementioned object, the present invention provide a base station to which a plurality of mobile terminals connect and that relays a communication between a communication device as a correspondent node of the plurality of mobile terminals and the plurality of mobile terminals. The base station includes: a configuration unit that configures, on a basis of policy information to configure a communication path between the mobile terminals and the communication device, a communication path from the base station itself to a gateway managing an access to a network to which the communication device belongs; and a storage unit that stores in a storage area, as association information, content of the policy information and identification information that identifies the communication path corresponding to the content. With this configuration, traffic can be flexibly controlled for terminals of a plurality of network-sharing operators. Herein a communication operator corresponds to a communication carrier providing a service of a mobile communication terminal, for example. The base station corresponds to a MR described later. The communication path refers to a communication path that a network side wants, for example, between a mobile terminal and a communication device. The communication path corresponds to a bearer described later.

According to the present invention, a communication system is provided, and the communication system includes: a plurality of mobile terminals belonging to different communication operators; and a base station that is connected by the plurality of mobile terminals and relays a communication between a plurality of communication devices that are correspondent nodes of the plurality of mobile terminals and corresponding to the different communication operators and the plurality of mobile terminals. In the communication system, a management device that performs mobile management of each mobile terminal selects, on a basis of policy information to configure a communication path between the mobile terminal and the corresponding communication device, a gateway located at the other end of a communication path from the base station satisfying the policy information, the gateway managing an access to a network to which the communication device belongs, and the base station configures the communication path from the base station itself to the selected gateway on a basis of the policy information, and stores, as association information, content of the policy information and identification information to identify the communication path corresponding to the content in a storage area. With this configuration, traffic can be flexibly controlled for terminals of a plurality of network-sharing operators. Herein the management device corresponds to a MME (Mobility Management Entity) described later.

A base station and a communication system of the present invention can flexibly control traffic for terminals of a plurality of network-sharing communication operators.

BRIEF DESCRIPTION OF THE DRAWINGS

FIG. 11 shows exemplary corresponding information in the fourth to the sixth Embodiments of the present invention.

FIG. 15 shows another example of corresponding information in the fourth to the sixth Embodiments of the present invention.

FIG. 17 shows still another example of corresponding information in the fourth to the sixth Embodiments of the present invention.

MODE FOR CARRYING OUT THE INVENTION

First Embodiment

Figure 1:
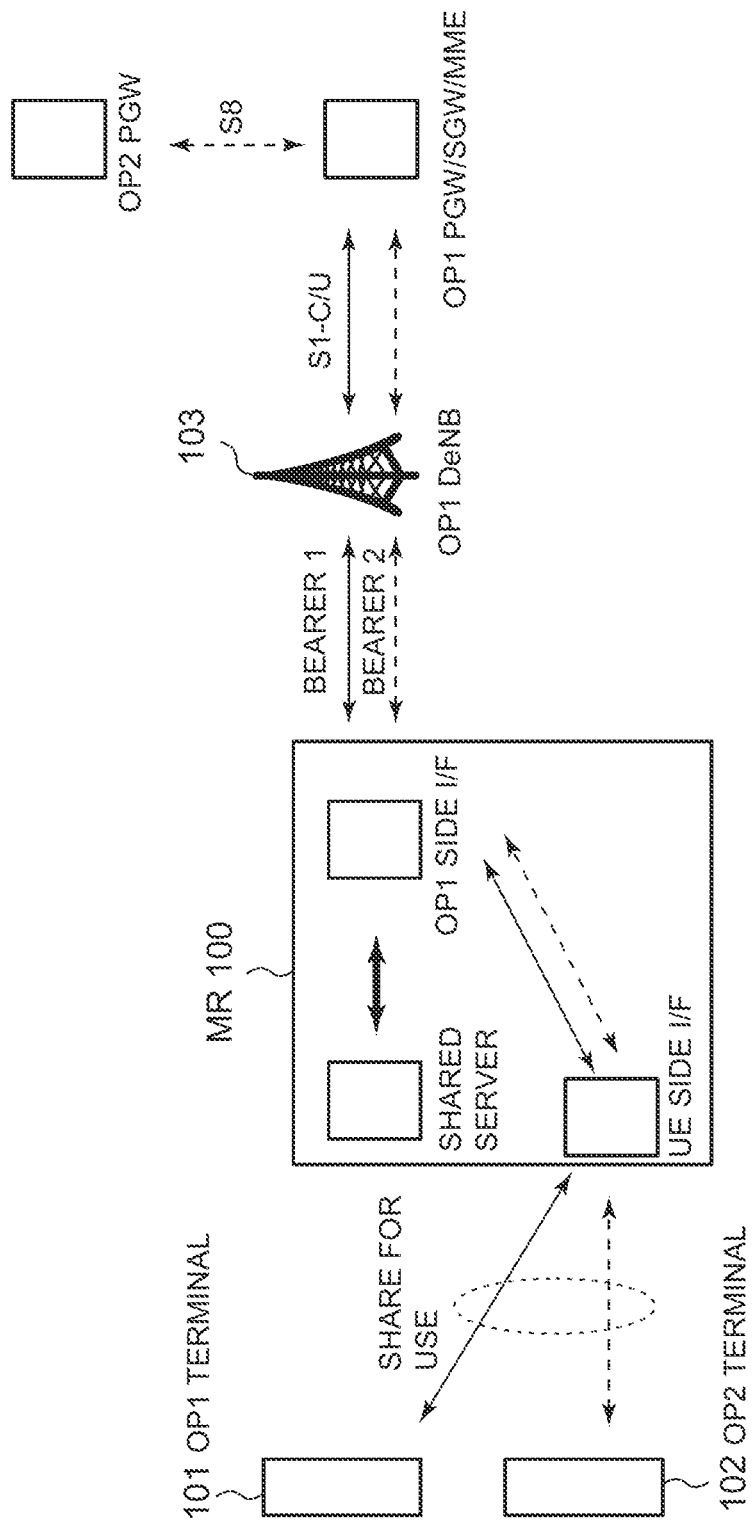
FIG. 1 is a conceptual diagram showing an exemplary configuration in first Embodiment of the present invention.

A feature of the first Embodiment resides in that a mobile relay (MR) divides a bearer between MR-GW beforehand for configuration based on policy information provided by a core network side (MME), whereby priority control of MR subordinate terminals is implemented. At this time, the MME selects a GW at which the bearer is to be configured on the basis of the policy information. Exemplary policy information may include QoS information such as delay or throughput, priority and the like. FIG. 1 is a conceptual diagram showing the configuration of the first Embodiment.

The MR 100 of FIG. 1 performs priority control for terminal traffic that is not a Home Public Land Mobile Network (HPLMN). Examples of the priority control include to provide only shared server content or to permit the usage only when it is available.

Figure 2:
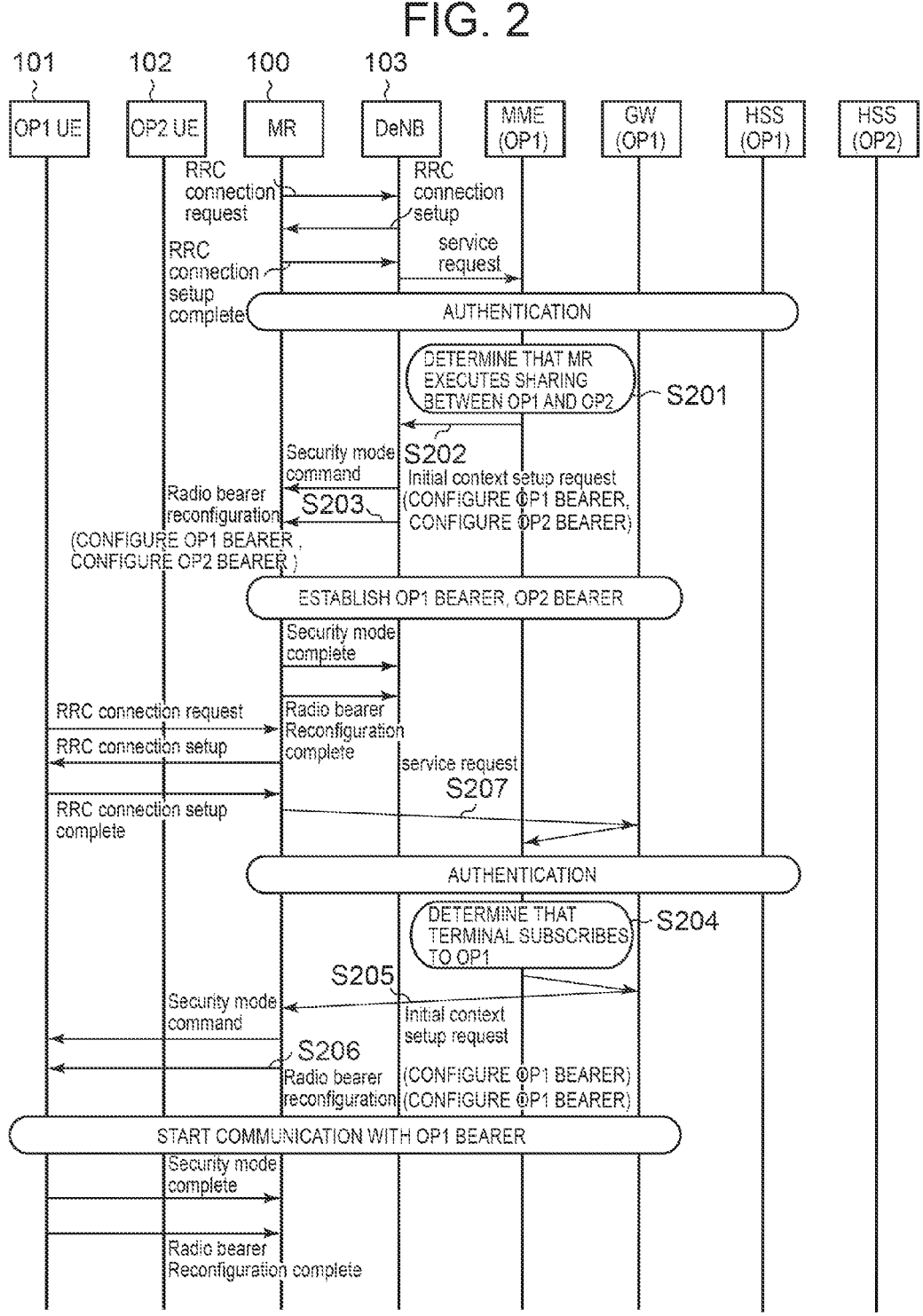
FIG. 2 is a sequence chart showing an exemplary sequence to implement the operation in the first Embodiment of the present invention.

In FIG. 1, although an operator 2 (OP2) terminal 102 executes sharing of a resource as in the form of network sharing as the subordinate of the MR 100, the architecture has the structure like roaming. More specifically, the OP2 terminal 102 uses a DeNB, a SGW (Serving Gateway) and a MME of an operator 1 (OP1) so as to connect to a PGW (Packet Data Network Gateway) of OP2 via the SGW of OP1 using S8 interface. A terminal 101 of OP1 connects to the PGW of OP1 through the SGW of OP1 as usual. In order to control QoS, bearer is controlled so as to assign the same QoS service to one bearer and to assign different QoS services to different bearers. FIG. 1 shows an example for simplification that the OP1 terminal 101 and the OP2 terminal 102 perform the same QoS service. For instance, the delay is within 200 ms, for example. In this case, these services are typically mapped to the same bearer because they are of the same QoS. In this case, however, separate bearers as two bearers (bearer 1 and bearer 2) are provided for the same QoS, and information from the OP1 is transmitted/received using the bearer 1 and information from the OP2 is transmitted/received using the bearer 2. Thereby, an OP1 DeNB 103 can manage the traffic of the OP1 terminal 101 and the traffic of the OP2 terminal 102 separately. FIG. 2 shows the procedure to implement this operation.

The procedure shown in FIG. 2 has a first feature in Step S201, Step S202 and Step S203 relating to bearer configuration of the MR 100. At Step S201, a MME determines that the MR 100 is a MR to accommodate the OP1 terminal (OP1 UE) 101 and the OP2 terminal (OP2 UE) 102, and the MME decides to divide bearers into a bearer for OP1 and a bearer for OP2. Then, at Step S202, the MME performs such configuration at the DeNB 103. Receiving a result thereof, at Step S203, the DeNB 103 performs the corresponding configuration to the MR. Herein, in this configuration, information indicating to which operator each bearer belongs may be shown.

Next, assume that the case where the OP1 terminal 101 establishes a connection. In this case, since it is the OP1 terminal 101, at Step 204, the MME decides to configure a bearer for OP1. Then, at Step 205, a notification is made to the MR 100 about configuration of the bearer for OP1. Thereafter at S206, the configuration is performed for the OP1 terminal 101. Herein although FIG. 2 shows only the case where the OP1 terminal 101 connects, when the OP2 terminal 102 connects, the operation is the same except that the bearer for OP2 is configured.

As a result of this operation, priority control among operators between MR and DeNB can be executed with the bearer. In the case where a bearer for the MR carries information on terminals as in the present embodiment, the DeNB cannot understand on which terminal the information is being transmitted/received. Therefore, in this case it becomes impossible to perform priority control for each terminal, which can be conventionally performed. This is a problem for the case where terminals belonging to a plurality of operators are accommodated as in the first Embodiment. Therefore, a bearer for each operator is configured for the MR as in the first Embodiment, whereby such a problem can be solved. More specifically, in downlink transmission, selection is made at the DeNB as to to which bearer the transmission is performed preferentially, thus performing priority control. In uplink transmission, selection is made at the MR as to to which bearer the transmission is performed preferentially, thus performing priority control.

Herein, there is a need to decide via which bearer a service request at Step S207 of FIG. 2 is to be transmitted. For this operation, the bearer for OP1 managing the MR 100 in FIG. 2 may be used, or when each bearer includes operator information, the MR 100 may check the operator of each terminal, and the bearer for OP1 may be used for a service request of the OP1 terminal 101 and the bearer for OP2 may be used for a service request of the OP2 terminal 102 from the stage of the service request transmission.

The first Embodiment shows the case that only one bearer is configured for each operator for simplification. However, a plurality of bearers may be configured for each operator. More specifically, four bearers may be configured for terminals of the operator 1 so as to provide fine QoS control, and two bearers only may be configured for terminals of the operator 2 so as to provide rough QoS control.

Figure 3:
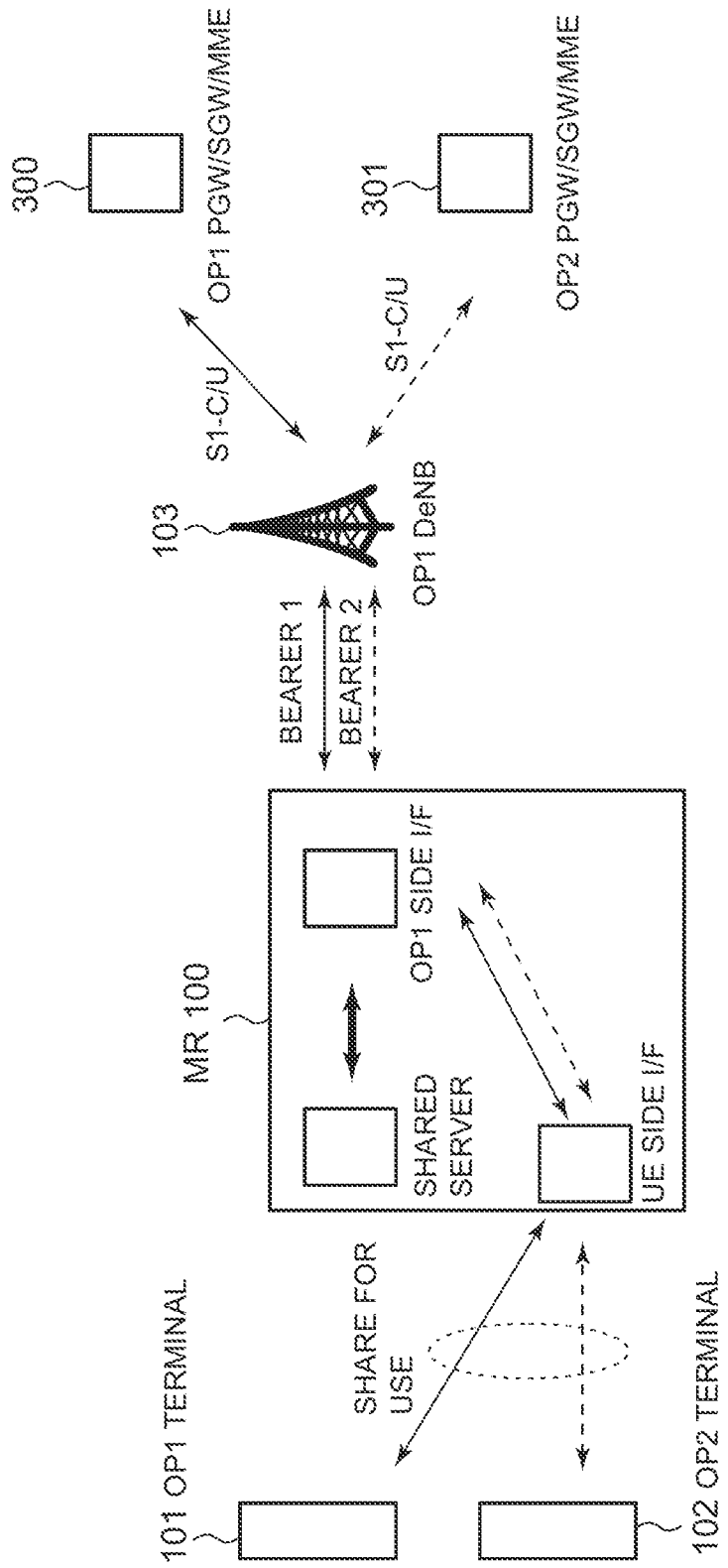
FIG. 3 is a conceptual diagram showing another exemplary configuration in the first Embodiment of the present invention.

FIG. 1 shows the implementation in the form of roaming. Instead, as shown in FIG. 3, the implementation may be in the form closer to general network sharing. More specifically, the options are branched a PGW/SGW/MME 300 of OP1 and PGW/SGW/MME 301 of OP2 from the OP1 DeNB 103. Even in this case, the operation of the first Embodiment is effective. Although the OP1 DeNB 103 cannot understand on which terminal the information flowing through the bearer relates to, since the operators are divided corresponding to the bearers, all information of the bearer 1 can be directed to the PGW/SGW/MME 300 of OP1 and all information of the bearer 2 can be directed to the PGW/SGW/MME 301 of OP2. At the same time, similarly to FIG. 1, priority control also may be applied independently to each of the bearer 1 and the bearer 2.

In the case of conventional network sharing, common access control/access limit is used among operators. Instead, different access control/access limit may be used to set priority for each operator. For instance, conventional access control may be applied to terminals of a main network operator, and access control/access limit may be performed using a newly configured parameter for terminals of network operators other than the main network operator. More specifically, ac-BarringInfo is included in System Information Block Type2 that is information sent with current notification information is applied to a high priority operator among the network sharing, i.e., a leading operator only of the PLMN-IdentityList included in System Information Block Type1 as a message on notification information, and access control/access limit is executed to the second or later operators of the PLMN-IdentityList using a newly configured parameter.

Conversely, new access control may be applied to a main operator terminal and conventional access control may be applied to operator terminals other than the main operator terminal, so as to allow the main operator terminal to perform sophisticated access control. The first Embodiment allows traffic to be distributed flexibly in accordance with the priority of traffic to a plurality of network sharing operator terminals.

Figure 4:
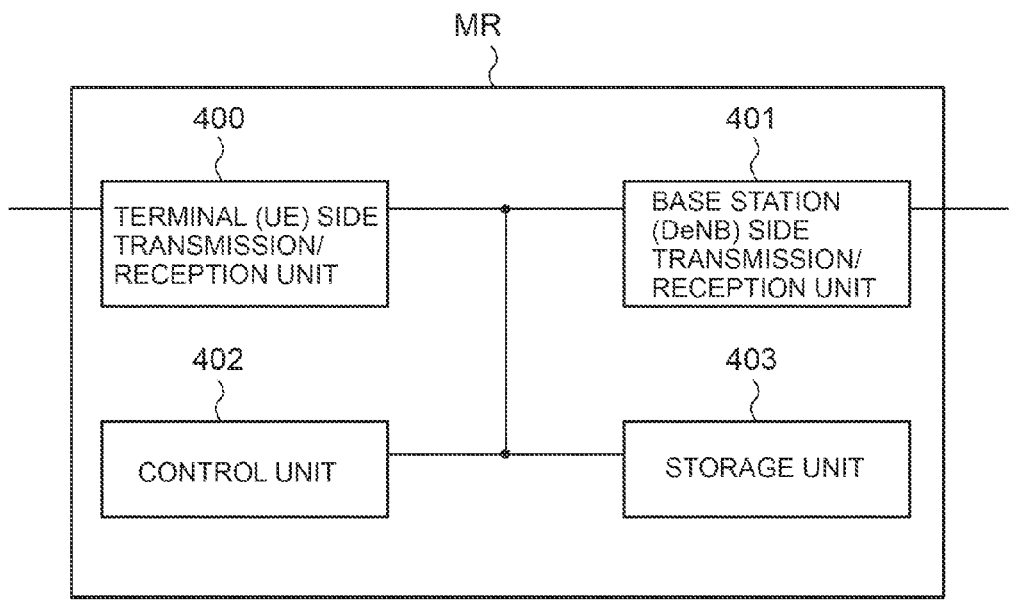
FIG. 4 shows an exemplary configuration of a MR according to the first and third to sixth Embodiments of the present invention.

Referring here to FIG. 4, one exemplary configuration of the MR in the first Embodiment is described below. As shown in FIG. 4, the MR includes a terminal (UE) side transmission/reception unit 400, a base station (DeNB) side transmission/reception unit 401, a control unit 402 and a storage unit 403. The terminal side transmission/reception unit 400 transmits/receives data to be exchanged with a UE, and corresponds to the UE side I/F of FIG. 1. The base station side transmission/reception unit 401 transmits/receives data to be exchanged with the DeNB (network) side, and corresponds to the OP1 side I/F of FIG. 1. The control unit 402 configures the aforementioned policy information, configures (establishes) a bearer, selects a bearer to distribute data and the like, and corresponds to the aforementioned configuration unit and selection unit. The storage unit 403 stores information required for functions of a MR such as storing of corresponding information including the correspondence between the policy and the type of a bearer after establishment of the bearer.

Second Embodiment

Figure 5:
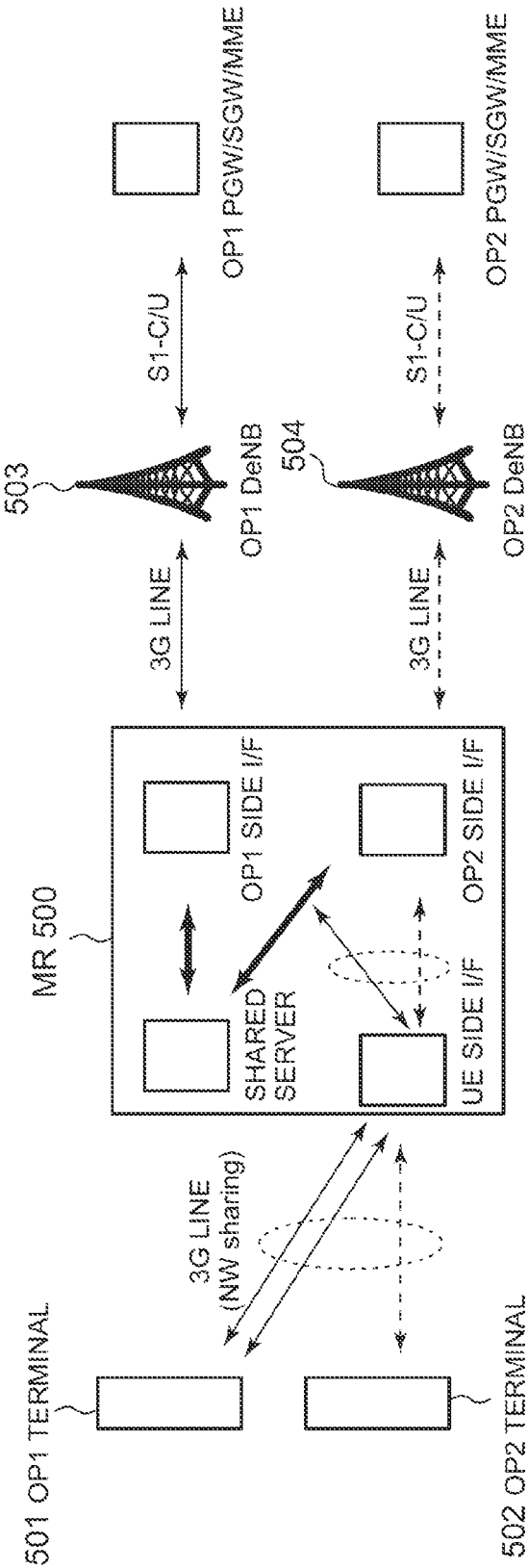
FIG. 5 is a conceptual diagram showing an exemplary configuration in second Embodiment of the present invention.

The second Embodiment shows an operation in the case where a MR has a plurality of interfaces for DeNB and can connect to a plurality of operators. FIG. 5 shows an example in this case. As shown in FIG. 5, network sharing is performed among subordinates of a MR 500 only, and the MR 500 has interfaces enabling a connection to each of a DeNB 503 of OP1 and a DeNB 504 of OP2. In this case, unlike the first Embodiment, there is no need to perform priority control between the DeNB and the MR 500 among operators. Seeing operator selection information of subordinate terminals of the MR 500, the MR 500 selects an operator not based on the bearer to be used but based on the DeNB to communicate with. In this case, however, unlike the first Embodiment, another problem occurs that a communication quality varies with operators. This is because the DeNB 503 of OP1 and the DeNB 504 of OP2 are located at different places and so have different propagation states of radio waves.

Figure 6:
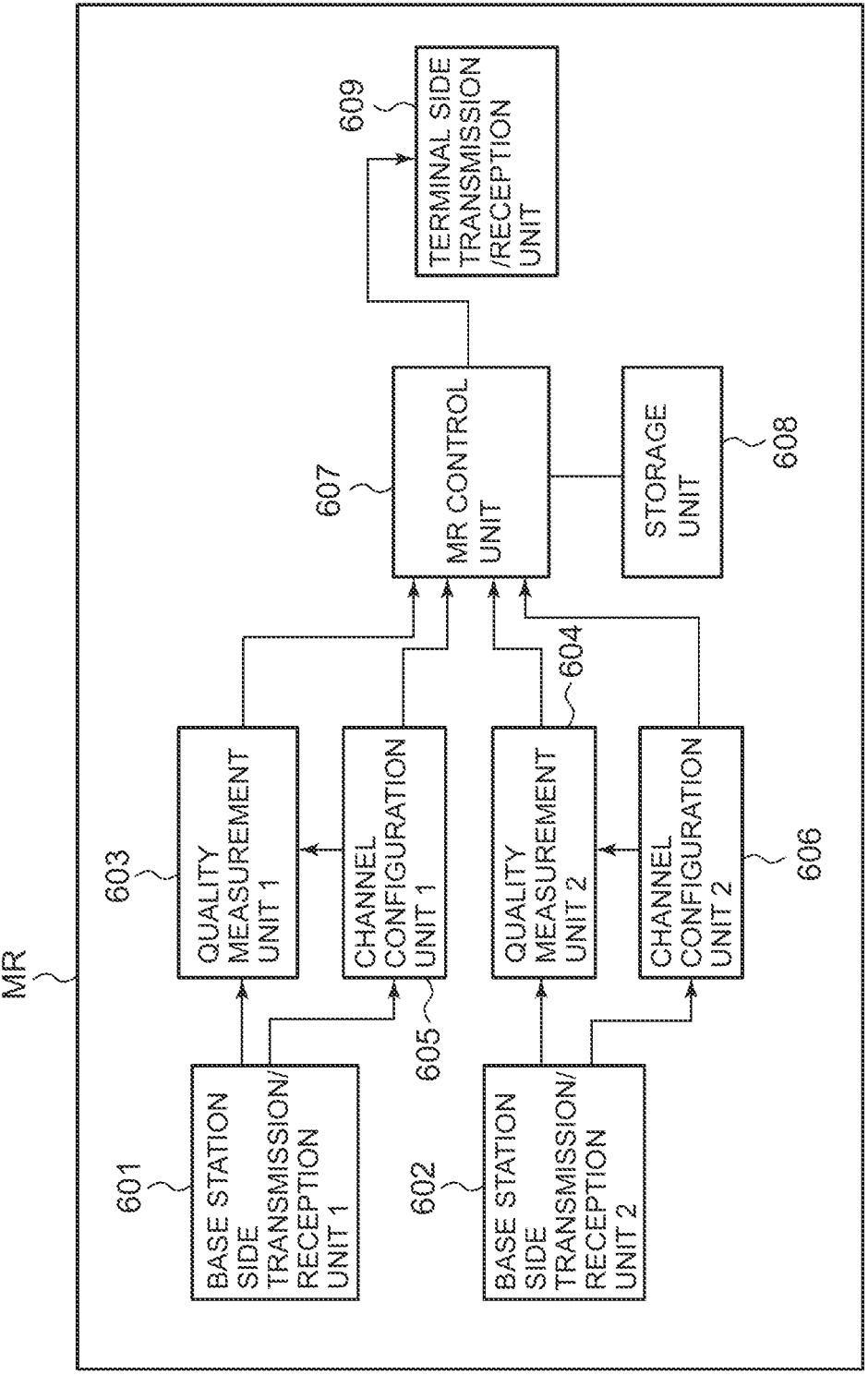
FIG. 6 shows an exemplary configuration of a MR in the second Embodiment of the present invention.
Figure 7:
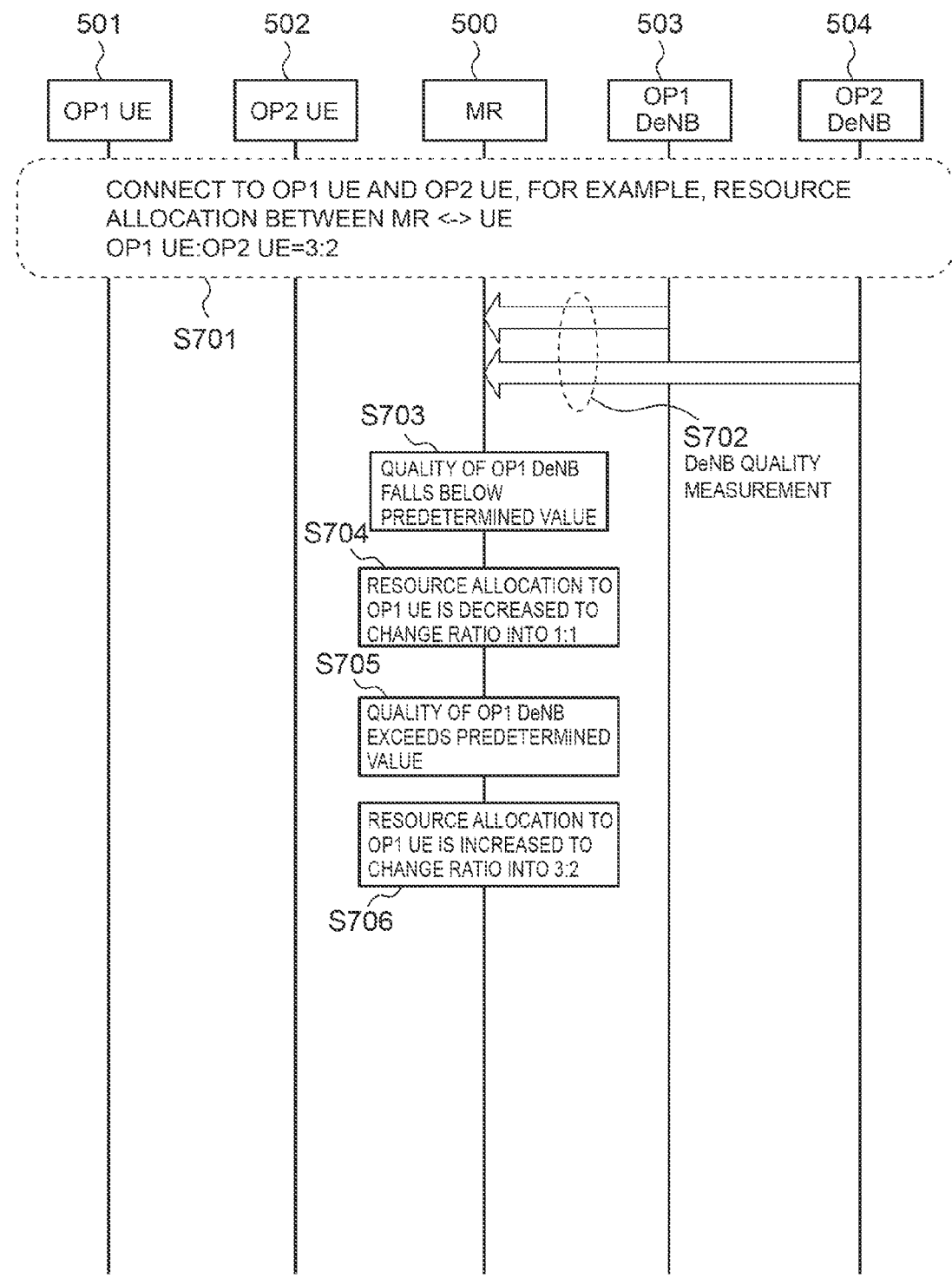
FIG. 7 is a sequence chart showing an exemplary sequence to show an operation by a MR in the second Embodiment of the present invention.

In order to cope with such a situation, control may be performed between the MR 500 and the terminal in accordance with the state between the MR 500 and the DeNB. For instance, when the communication state between the OP1 DeNB 503 and the MR 500 is good, OP1 may be preferentially controlled between the MR 500 and a terminal as well, and when the communication state between the OP2 DeNB 504 and the MR 500 is good, OP2 may be preferentially controlled between the MR 500 and a terminal as well. This is for implementing a more real-time communication for the terminal. FIG. 6 and FIG. 7 show blocks and procedure to implement such an operation.

The following describes the blocks of FIG. 6. A base station (DeNB) side transmission/reception unit 1 (601) and a base station (DeNB) side transmission/reception unit 2 (602) perform transmission/reception with the base station (DeNB) side, and correspond to the OP1 side I/F and OP2 side I/F of FIG. 5, respectively. That is, the base station (DeNB) side transmission/reception unit 1 (601) and the base station (DeNB) side transmission/reception unit 2 (602) perform transmission/reception with the OP1 DeNB 503 and the OP2 DeNB 504 in FIG. 5. The base station (DeNB) side transmission/reception unit 1 (601) and the base station (DeNB) side transmission/reception unit 2 (602) transmit a signal among the received signals to measure a reception quality to a quality measurement unit 1 (603) and a quality measurement unit 2 (604), respectively. The base station (DeNB) side transmission/reception unit 1 (601) and the base station (DeNB) side transmission/reception unit 2 (602) further transmit configuration information received relating to a communication between the MR and the terminals to a channel configuration unit 1 (605) and a channel configuration unit 2 (606), respectively. The quality measurement units 1 and 2 have a function to measure the quality of a received signal and a function to inform a MR control unit 607 that the quality becomes better or worse than values set by the channel configuration unit 1 (605) and the channel configuration unit 2 (606).

The channel configuration units 1, 2 perform processing relating to channel control on the basis of received control information. In this case, the channel configuration units 1, 2 especially have a function to inform each of the quality measurement unit 1 (603) and the quality measurement unit 2 (604) about information on reception quality check on the base station side and a function to perform configuration at the MR control unit 607 to be used for a communication between the MR and a terminal. The MR control unit 607 has a function to decide a control operation as the MR in accordance with configurations from the channel configuration unit 1 (605) and the channel configuration unit 2 (606). The MR control unit 607 further has a function to change, on the basis of a notification from the quality measurement unit 1 (603) and the quality measurement unit 2 (604), a scheduling operation for a terminal connected to the MR based on to which base station (i.e., the OP1 DeNB 503 or the OP2 DeNB 504) the terminal connects. A terminal (UE) side transmission/reception unit 609 performs transmission/reception in accordance with the operation of the MR control unit 607, and corresponds to the UE side I/F of FIG. 5. Herein, a group including the quality measurement unit 1 (603), the quality measurement unit 2 (604), the channel configuration unit 1 (605), the channel configuration unit 2 (606) and the MR control unit 607 corresponds to the control unit 402 of FIG. 4.

The operation of these blocks is described with reference to the procedure shown in FIG. 7. At Step S701, the MR 500 connects to an OP1 UE 501 and an OP2 UE 502, and further decides resource allocation between the OP1 UE 501 and the OP2 UE 502. Although only one terminal is described for an operator, if there is a plurality of terminals, the ratio for the terminals in total will be decided. This processing is implemented as the flow of the base station side transmission/reception unit 1 (601)→the channel configuration unit 1 (605)→the MR control unit 607 and the flow of the base station side transmission/reception unit 1 (601)→the channel configuration unit 1 (605)→the MR control unit 607. At this step, a threshold for the quality measurement result also is set at each of the quality measurement unit 1 (603) and the quality measurement unit 2 (604). Assume herein that the ratio of resource allocation between the OP1 UE 501 and the OP2 UE 502 is 3:2, for example.

At Step S702, the MR 500 executes measurement of the OP1 DeNB 503 and the OP2 DeNB 504. This operation is performed as the flow of the base station side transmission/reception unit 1 (601)→the quality measurement unit 1 (603) and the flow of the base station side transmission/reception unit 2 (602)→the quality measurement unit 2 (604). At Step S703, when the quality of the OP1 DeNB 503 falls below the threshold set at Step S701, a notification as such is transmitted from the quality measurement unit 1 (603) to the MR control unit 607. At Step S704, the MR control unit 607 decides to reduce resource allocation to the OP1 UE 501, and as a result, assume that the allocation becomes 1:1. At Steps S705 and S706, the quality measurement unit 1 (603) detects that the quality for the OP1 DeNB 503 is improved (the quality exceeds the threshold), based on a notification as such, the MR control unit 607 returns the resource allocation to the normal operation. Such an operation allows resource allocation in the MR to be changed on the basis of the communication quality with the base station side, and therefore the resources as subordinates of the MR can be allocated effectively. Note here that the operation of access control/access limit described in the first Embodiment is applicable to the second Embodiment as well.

That is, the second Embodiment includes a plurality of wireless connection interfaces connecting to a network of a communication operator and a quality measurement unit that measures a communication quality of the plurality of wireless connection interfaces, and a configuration unit (MR control unit 607) has a function to change a communication path in accordance with a measurement result measured by the quality measurement unit.

Third Embodiment

Figure 8:
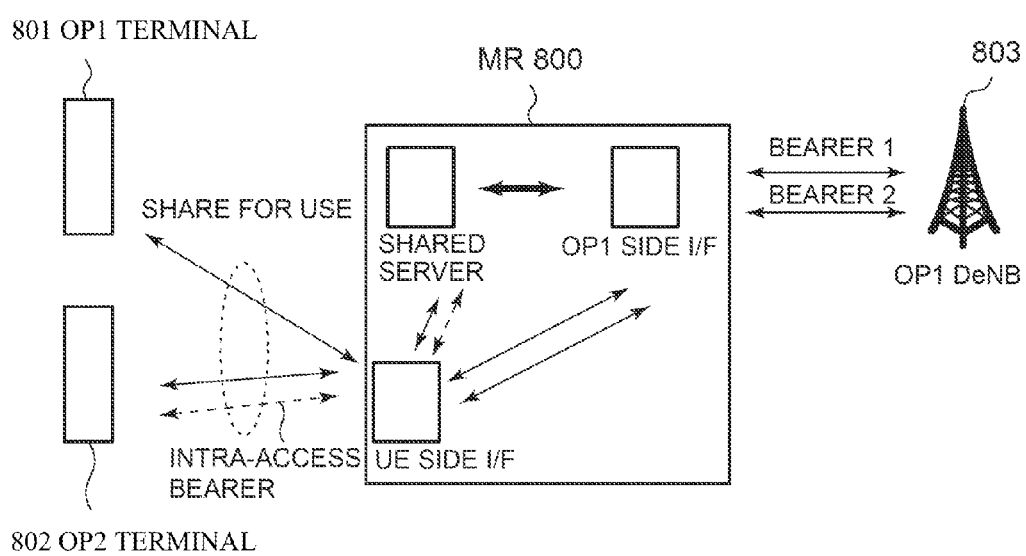
FIG. 8 is a conceptual diagram showing an exemplary configuration in the third Embodiment of the present invention.

A feature of the third Embodiment resides in that priority control is executed by differentiating an access to a service provided by a MR such as delivery of content included in the MR or a server providing a data cache service from an access requiring a resource between the MR and a DeNB. FIG. 8 shows an example of this. In this case, a bearer for exchange with a server in a MR 800 is configured for each of an OP1 terminal 801 and an OP2 terminal 802. Thereby, an access to a server in the MR 800 is performed preferentially, whereby a resource between the MR 800 and an OP1 DeNB 803 can be reduced.

Figure 9:
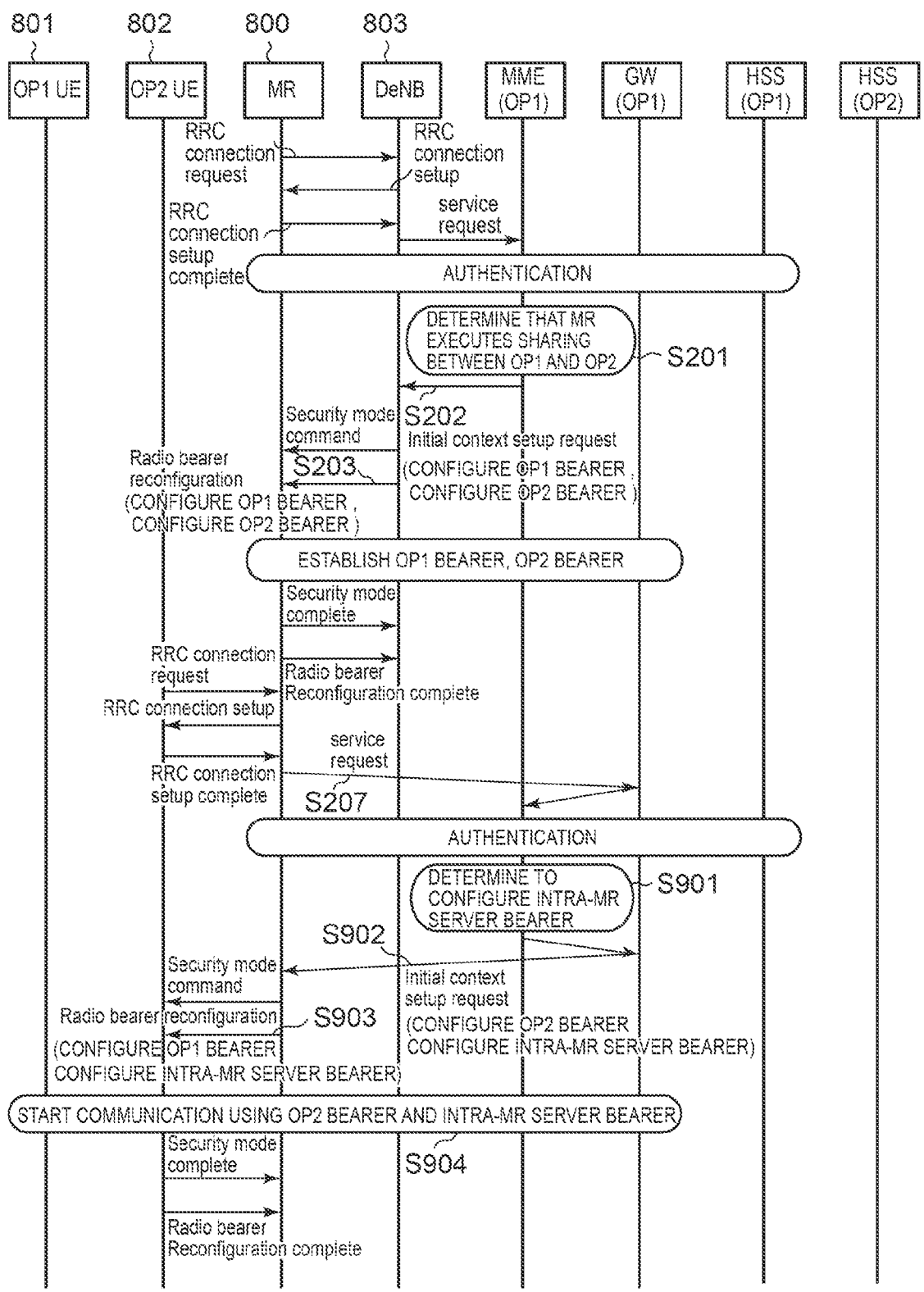
FIG. 9 is a sequence chart showing an exemplary sequence to implement the operation in the third Embodiment of the present invention.

FIG. 9 shows procedure of the operation, which is based on FIG. 2. The procedure is different from that shown in FIG. 2 in that a connection operation of the OP2 terminal (OP2 UE) 802 is described and an intra-MR server bearer as a feature of the third Embodiment is configured for use. At Step S901, a MME decides to configure this intra-MR server bearer. Based on this, at Step S902, Configuration of the intra-MR server bearer is performed from the MME to the MR 800. In response to this configuration, at Step S903, the MR 800 configures the intra-MR server bearer for a terminal. Thereby, after Step S904, the intra-MR bearer is used for a communication with the intra-MR server, and the OP2 bearer is used for a communication connecting to the DeNB 803 for communication.

When a resource for the MR 800 is not enough at the DeNB 803 and access control is applied to the OP2 terminal 802, the DeNB 803 controls so as not to perform communication using the OP2 bearer. On the other hand, when an extra resource is available between the MR 800 and a terminal, a communication to the intra-MR server may be permitted. In order to implement this, the intra-MR server bearer and the OP2 bearer are separately configured for a communication between the MR 800 and a terminal and priority of the intra-MR server bearer is made higher, whereby they can be controlled so that only the traffic to the intra-MR server can be transmitted from the terminal to the MR 800.

Although FIG. 9 shows the example that the MME makes a determination, the MR may make the determination. In this case, the operation at Step S901 is executed by the MR 800, and at Step S902, the intra-MR server bearer is not configured. Note here that the operation of the third Embodiment is applicable not only to the case of network sharing performed but also the case of network sharing not performed. Note here that the operation of access control/access limit described in the first Embodiment is applicable to the third Embodiment as well. More specifically, an additional parameter may be set so as to enable permission when a terminal accesses the content in the MR.

That is, in the third Embodiment, a configuration unit has a function to configure a communication path for internal access between a mobile terminal and a base station, and for an access of the mobile terminal to a service provided by the base station, a communication path for internal access is used for communication.

Fourth Embodiment

A feature of the fourth Embodiment resides in that a mobile relay divides a bearer between MR-GW beforehand for configuration on the basis of policy information provided by a core network side (MME). At this time, the MME selects a GW at which a bearer is to be configured on the basis of the policy information. Exemplary policy information may include information such as delay or throughput. Determination may be made based on such policy information as to whether or not to perform SIPTO. The SIPTO is an abbreviation of Selected IP Traffic Offload, which is a function to traffic-offloads a large amount of traffic from a terminal to another network. The necessity or not of the SIPTO may include the following (1) to (3), for example.

(1) SIPTO is not performed for traffic of a terminal of a main network operator possessing a line, but SIPTO is performed for traffic of a terminal of a network operator other the main that rents the line.

(2) SIPTO is not performed in the case where the content that a terminal accesses uses a main network only, but SIPTO is performed in the case of using a network other than the main.

(3) SIPTO is not performed for data having higher QoS (Quality of Service) (requiring session continuity), but SIPTO is performed for data having low QoS (not requiring session continuity).

Figure 10:
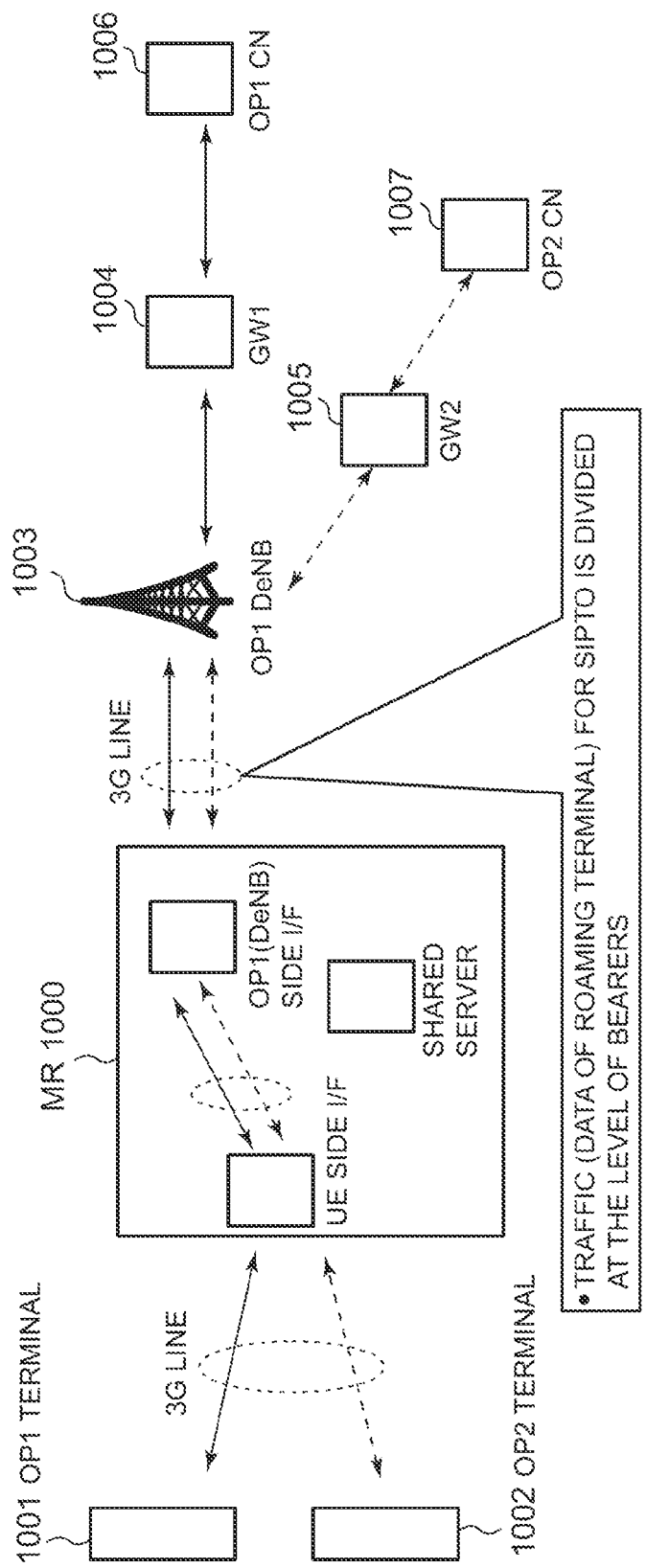
FIG. 10 shows an exemplary flow of terminal data in a communication network in the case of policy information (1) in fourth to the sixth Embodiments of the present invention.

Further when the bearer is configured, as shown in FIG. 11, the MR associates policy information (e.g., the necessity or not of SIPTO) with the types of bearers, and the MR holds them. Then, at the time of connection of terminals 1001 and 1002, on the basis of information included in a connection establishment request message from the terminals 1001 and 1002, as shown in FIG. 10, a MR 1000 distributes data of the OP terminals (UEs) 1001, 1002 to the corresponding bearers on the basis of the policy information.

Figure 12:
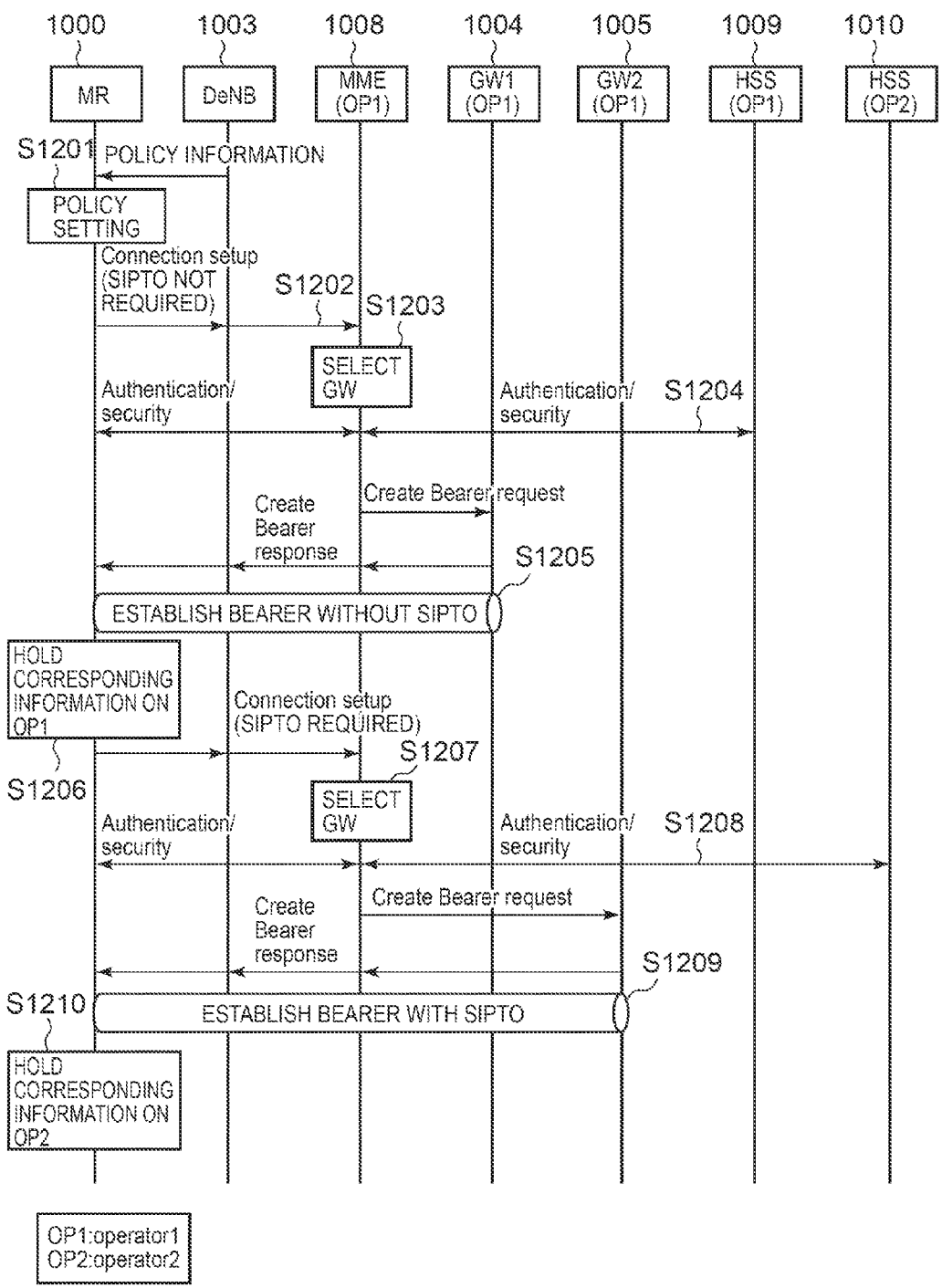
FIG. 12 is a sequence chart showing an exemplary sequence of bearer configuration processing by a MR in the fourth Embodiment of the present invention.
Figure 13:
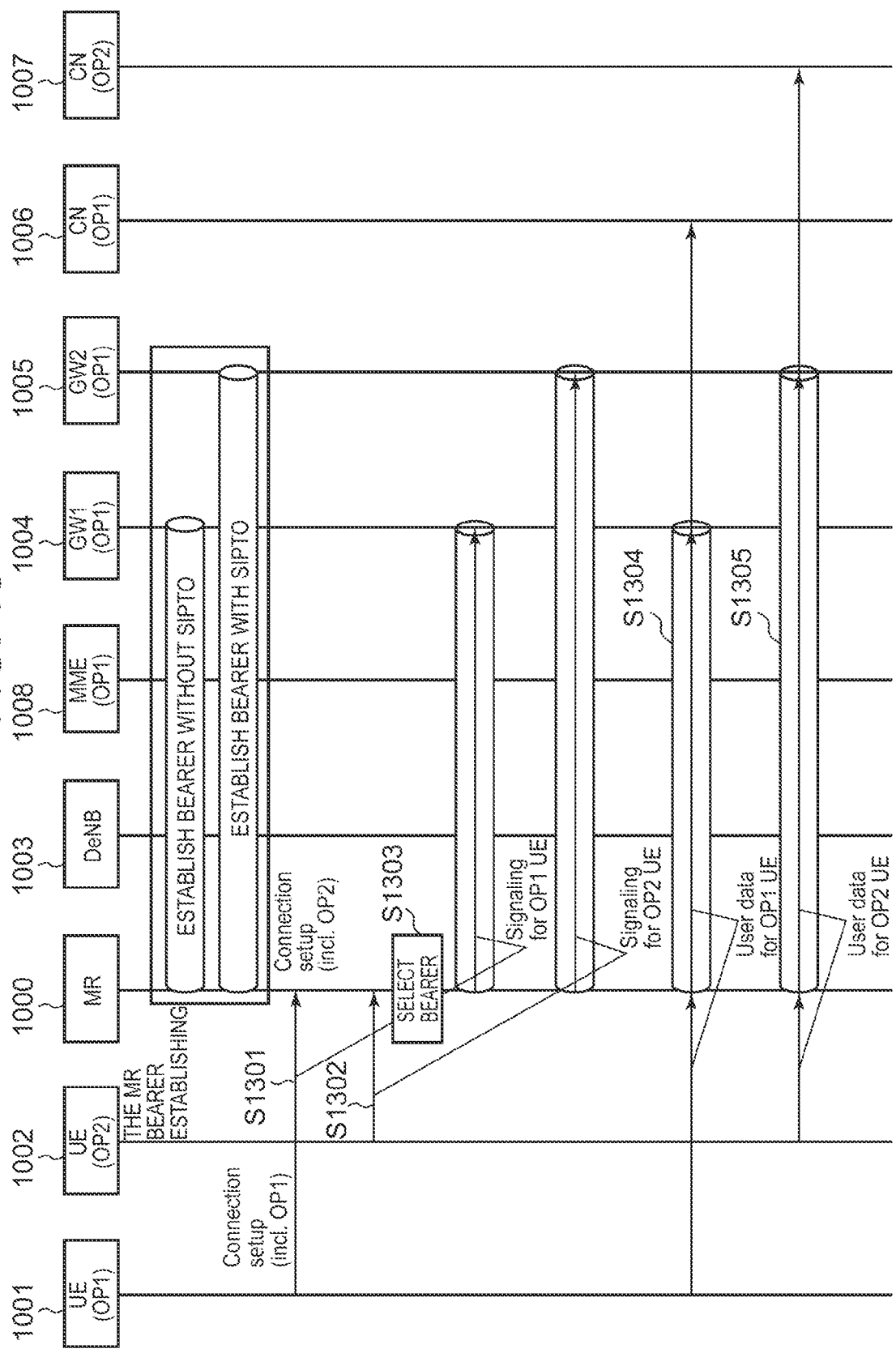
FIG. 13 is a sequence chart showing an exemplary sequence of data distribution by a MR in the fourth Embodiment of the present invention.

Next, as specific sequences, FIG. 12 shows a sequence of the bearer configuration processing by the MR 1000 and FIG. 13 shows a sequence to distribute data by the MR 1000 when the terminals 1001 and 1002 connect to the MR 1000. Assume herein that SIPTO is not performed for the traffic of the operator 1 (OP1) and SIPTO is performed for the traffic of the operator 2 (OP2).

To begin with, an exemplary bearer configuration processing is described. As shown in FIG. 12, the MR 1000 configures policy information on the basis of the policy information received from a network side (DeNB 1003) (Step S1201). Thereafter the MR 1000 transmits the policy information to a MME 1008 (Step S1202), and the MME 1008 selects a GW on the basis of the received policy information (Step S1203). The MME 1008 accesses a HSS (Home Subscriber Server) 1009 as an authentication server for authentication processing (Step S1204). After the authentication processing is completed, the MR 1000 establishes a bearer for without SIPTO with the selected GW1 1004 (Step S1205). After the bearer is established, the MR 1000 holds association information including the necessity or not of SIPTO associated with the types of bearers (corresponding information including the correspondence) in a predetermined storage area (Step S1206).

That is the description for a sequence of bearer establishment when SIPTO is not necessary. Similarly, when SIPTO is necessary, the bearer is established as follows, i.e., the MME 1008 selects a GW (Step S1207), authentication processing is performed (Step S1208), and after the authentication processing is completed, the MR 1000 establishes a bearer for with SIPTO with the selected GW2 1005 (Step S1209). After the bearer is established, the MR 1000 holds corresponding information including the necessity or not of SIPTO associated with the types of bearers in a predetermined storage area (Step S1210).

Next, exemplary processing to distribute data by the MR 1000 is described below. As shown in FIG. 13, after the bearer is established, when the MR 1000 receives a connection establishment request message (Connection setup) from the UEs 1001 and 1002 (Steps S1301, S1302), the MR 1000 selects a bearer to distribute data from the UEs 1001 and 1002 on the basis of the held corresponding information (Step S1303). Herein, the MR 1000 holds information on the UE connected once, and data sent from the corresponding UE thereafter is transmitted on the basis of the held information (Steps S1304, S1305). More specifically, the UE side I/F (terminal side transmission/reception unit) of FIG. 10 receives data from the UE, the control unit 402 as shown in FIG. 4 selects a communication path (bearer) through which the received data is to be transmitted on the basis of the stored corresponding information, and the data is transmitted to the selected bearer.

Figure 14:
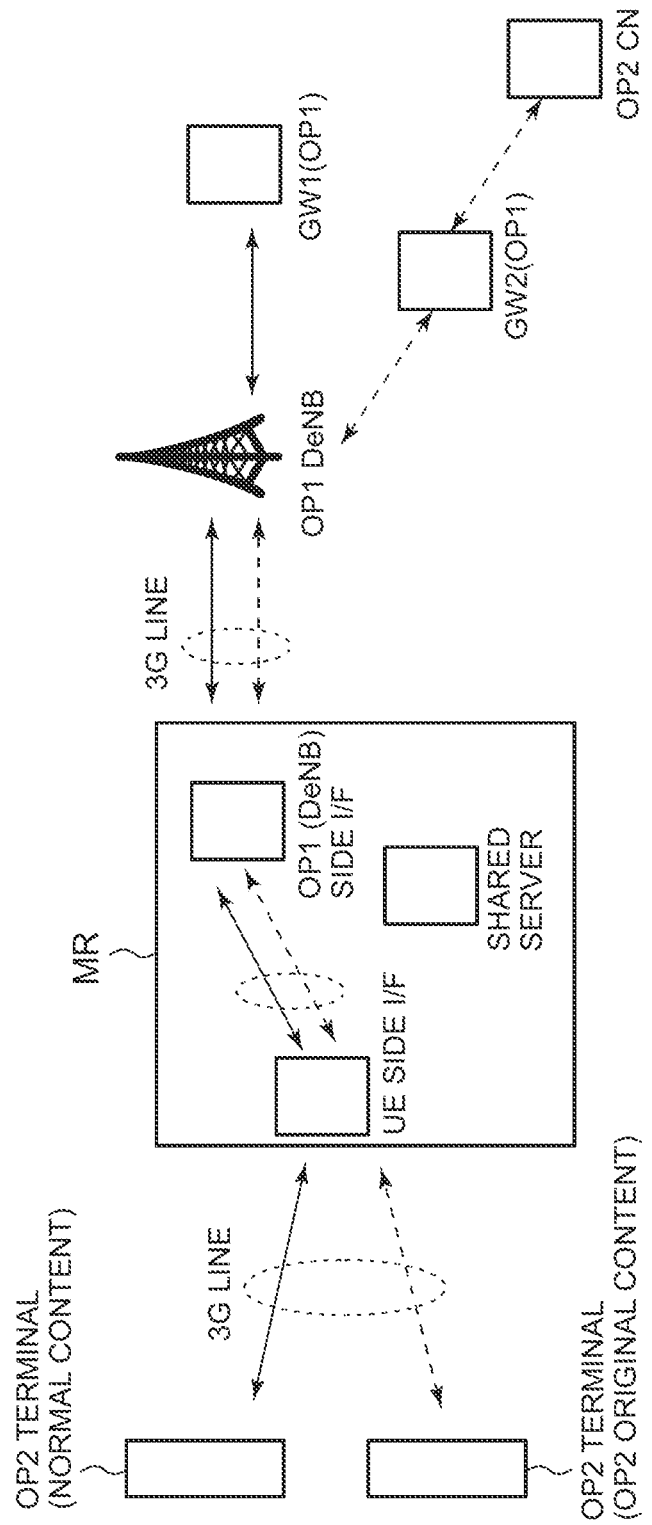
FIG. 14 shows an exemplary flow of terminal data in a communication network in the case of policy information (2) in the fourth to the sixth Embodiments of the present invention.
Figure 16:
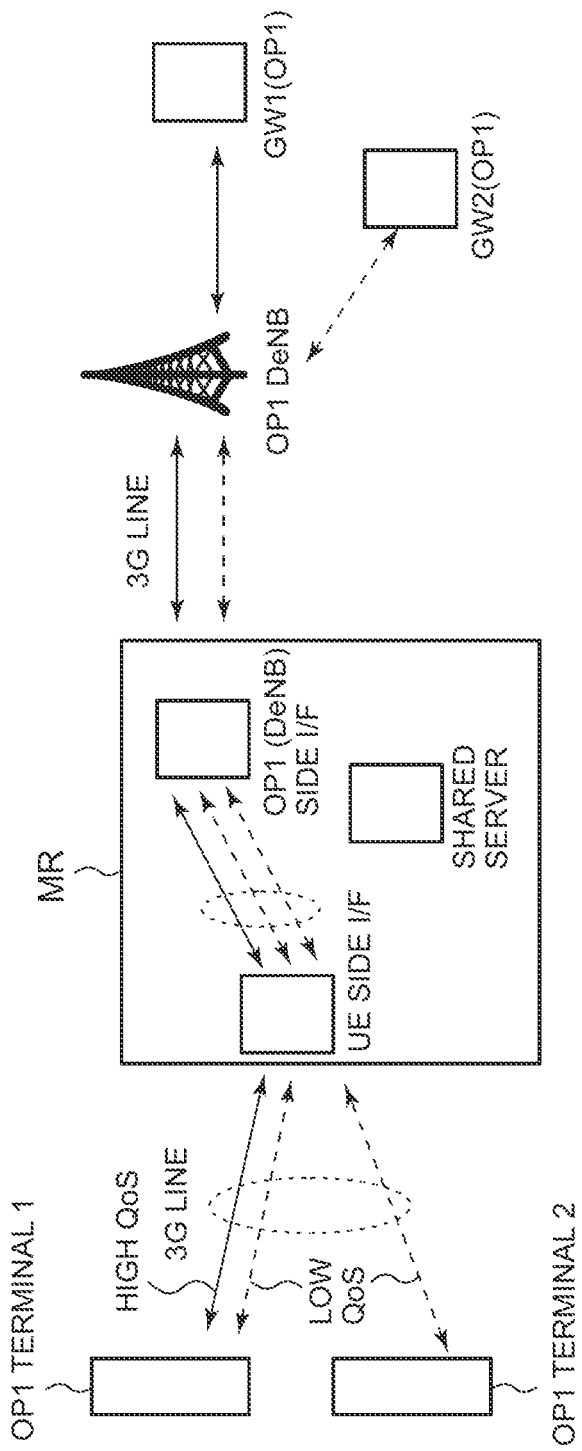
FIG. 16 shows an exemplary flow of terminal data in a communication network in the case of policy information (3) in the fourth to the sixth Embodiments of the present invention.

Note here that although the above case describes (1) of the policy information (one of the examples about the necessity or not of SIPTO) as the policy, the same goes for the case of (2) or (3) of the policy information. FIG. 14 and FIG. 16 show the flow of terminal data in the respective cases. FIG. 15 shows corresponding information in the case of the policy information (2), and FIG. 17 shows corresponding information in the case of the policy information (3). In the case of FIG. 17, since the mobile relay can understand QoS with a QoS identifier of a data packet, the corresponding information includes the correspondence between "QoS" and "Bearer Types".

The above describes the example of bearer establishment and data distributing, which are not limiting examples. That is, the number of bearers may be changed in accordance with the policy information. For instance, the number of bearers of OP1 as a main network operator may be set larger than the number of bearers of OP2.

Fifth Embodiment

Figure 18:
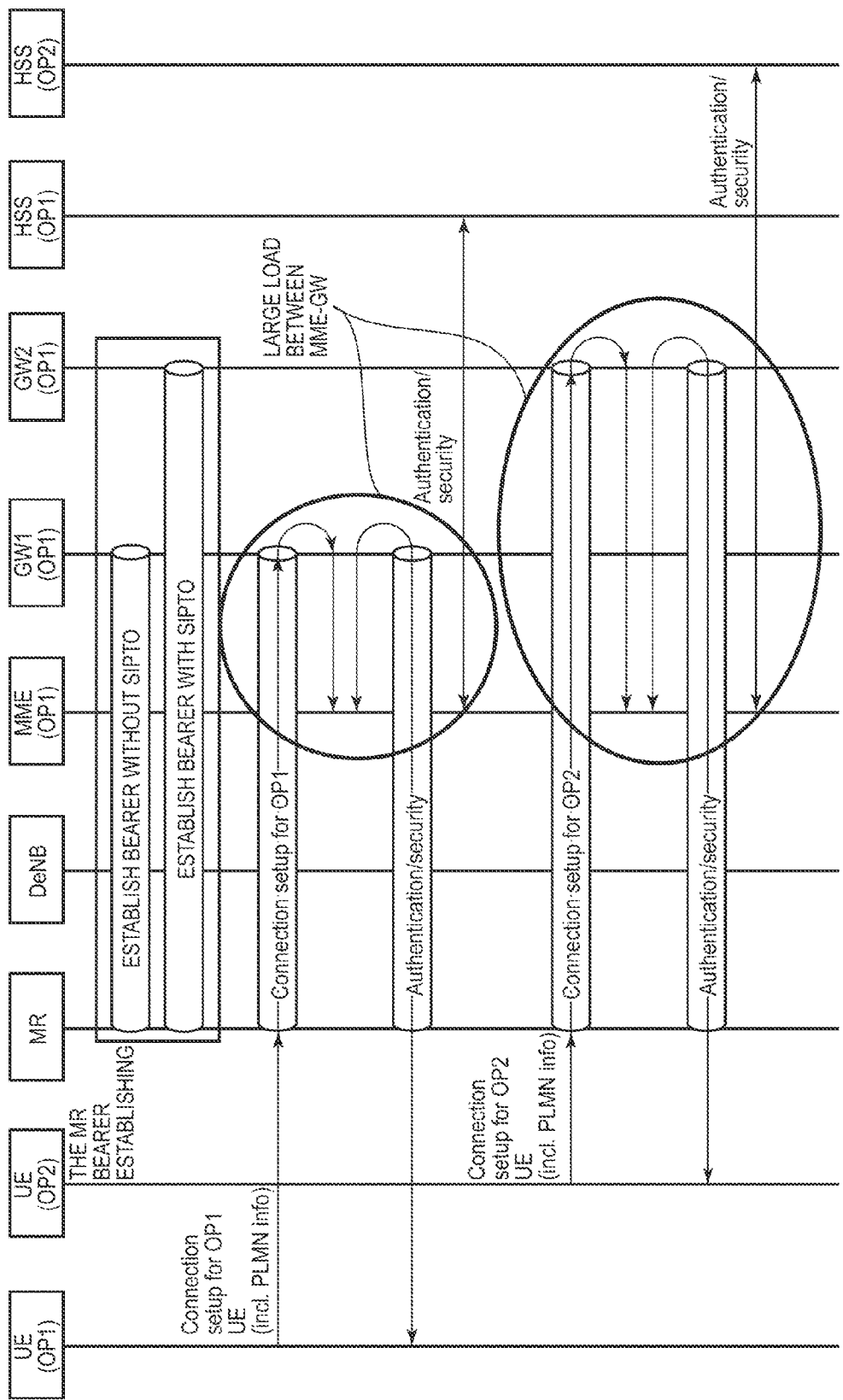
FIG. 18 describes a problem to be considered for an authentication method of a terminal to connect to a MR according to fifth Embodiment of the present invention.

The fifth Embodiment focuses on an authentication method of a terminal to connect to a mobile relay. Typically, authentication for a terminal to connect to a macro base station is performed by accessing a HSS that is an authentication server from the macro base station directly via a MME. Meanwhile, the mobile relay configures a bearer between MR-GW as stated above, and control information on a terminal to connect to the MR is transmitted to the GW via this bearer. Therefore, as shown in FIG. 18, the authentication information on the terminal has to always pass through the GW (GW1, GW2), and therefore a load between MME-GW is large.

Figure 19:
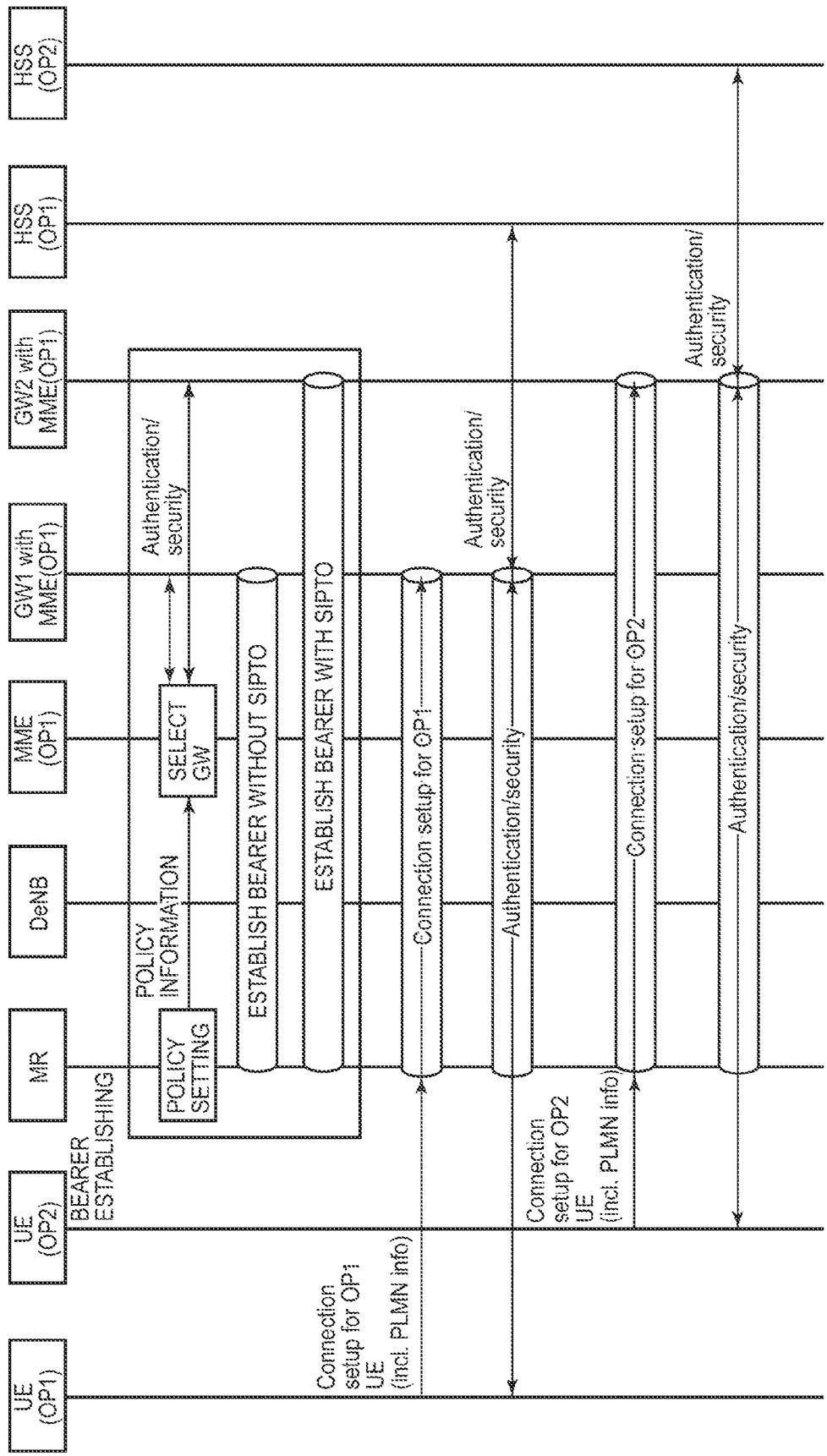
FIG. 19 is a sequence chart showing an exemplary authentication sequence of a terminal to connect to a MR according to the fifth Embodiment of the present invention.

Thus in the fifth Embodiment, a GW is provided, having a MME function, i.e., authentication processing and an interface function with a HSS including other network operators. The MME selects a GW equipped with a MME function on the basis of policy information acquired from the MR, thus establishing a bearer. More specifically, when the MME (management device) selects a GW, the MME selects a GW having a function of the MME, thus establishing a bearer. Authentication check is performed from the GW directly to the HSS without via the MME. FIG. 19 shows an authentication sequence of a terminal to connect to the MR in that case.

Figure 20:
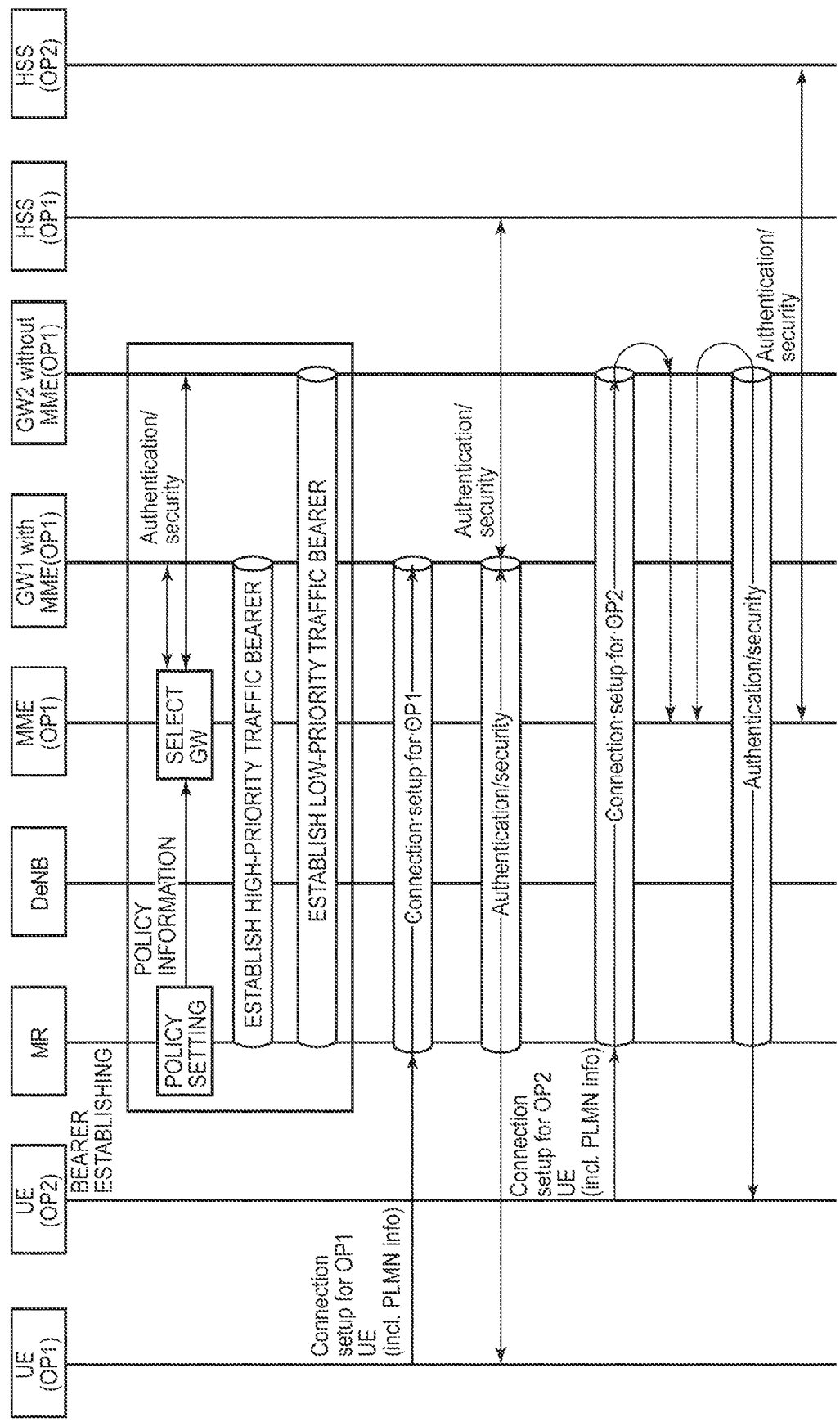
FIG. 20 is a sequence chart showing another exemplary authentication sequence of a terminal to connect to a MR according to the fifth Embodiment of the present invention.

Note here that, when the MME selects a GW, the MME may select a GW performing authentication via the MME depending on the priority of traffic. More specifically, the MME (management device) may select a GW depending on the priority of traffic of communication. That is, the traffic where a bearer is to be configured using a GW1 2000 equipped with a MME function is high-priority traffic, e.g., traffic of a terminal of a main operator. On the other hand, the traffic where a bearer is to be configured using a GW2 2001 without a MME function is low-priority traffic, e.g., traffic of a terminal of an operator other than the main operator. FIG. 20 shows an authentication sequence of this case. According to the fifth Embodiment, authentication processing for a terminal to connect to a MR can be simplified, and a signaling load required for authentication can be reduced.

Sixth Embodiment

A feature of the sixth Embodiment resides in that, when a MME selects a GW having a MME function during bearer configuration of a MR to secure a plurality of bearers in the second Embodiment, a bearer of the authentication processing via a MME and a bearer of the authentication processing not via a MME are provided. More specifically, the selected GW performs authentication processing of a connecting UE via a MME depending on the priority of traffic of a communication. Traffic using a bearer where authentication is performed not via a MME is high-priority traffic, e.g., traffic of a terminal of a main operator.

Figure 21:
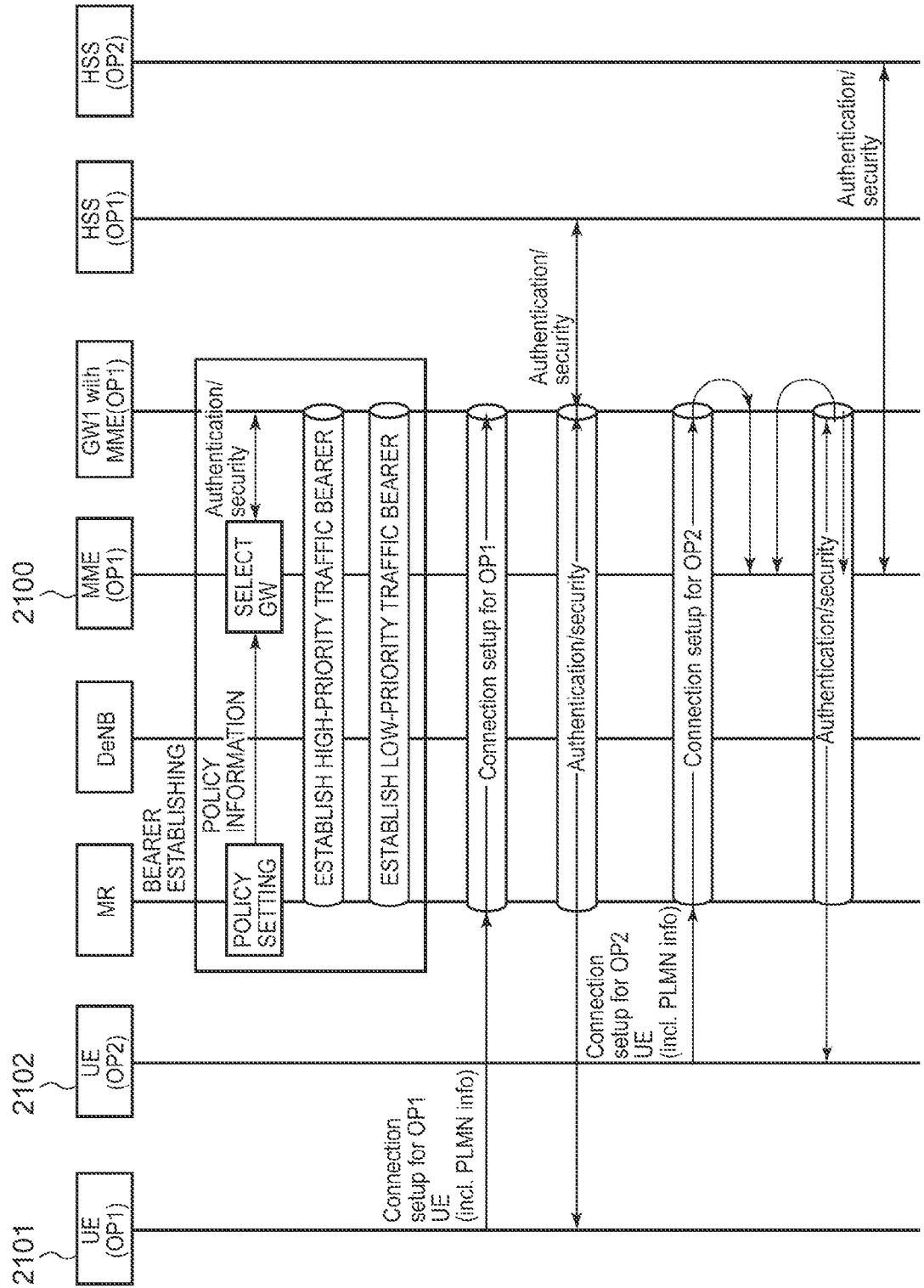
FIG. 21 is a sequence chart showing an exemplary authentication sequence of a terminal to connect to a MR according to the sixth Embodiment of the present invention.

On the other hand, traffic using a bearer where authentication is performed via a MME is low-priority traffic, e.g., traffic of a terminal of an operator other than the main operator. FIG. 21 shows an authentication sequence for a terminal in the sixth Embodiment. As shown in FIG. 21, authentication processing in one bearer (authentication processing for a connection establishment request message of a UE 2101) is performed not via a MME 2100, and authentication processing in the other bearer (authentication processing for a connection establishment request message of a UE 2102) is performed via the MME 2100. According to the sixth Embodiment, even when a plurality of bearers are established using the same GW, a part of the processing load on the GW can be placed to a MME, and therefore a load on the GW can be reduced.

Seventh Embodiment

Figure 22:
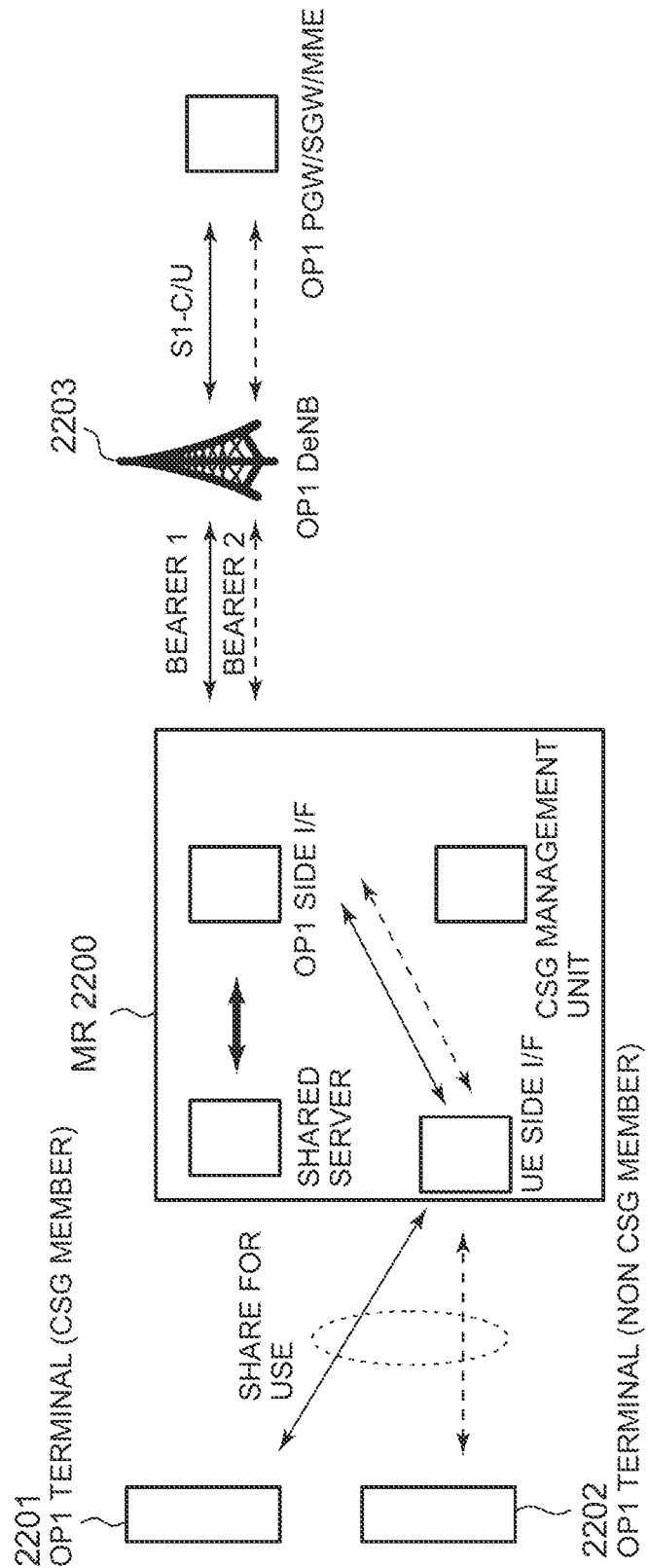
FIG. 22 is a conceptual diagram showing an exemplary configuration in seventh Embodiment of the present invention.

Unlike the first to the sixth Embodiments, the seventh Embodiment controls a terminal accessing a MR using a function of Closed Subscriber Group (CSG). FIG. 22 is a conceptual diagram showing the configuration of the seventh Embodiment. FIG. 22 is based on FIG. 1, and the following describes differences only.

In FIG. 22, a MR 2200 has a CSG function. The CSG function is to permit accesses only by a terminal belonging to a predetermined group such as a terminal having a special access right called CSG (hereinafter called a CSG member) and not to permit accesses by other terminals (hereinafter called a non CSG member). Herein, access is not completely rejected from a non CSG member, and although an access is permitted, priority may be placed on a CSG member. A cell having such a function is called a hybrid in 3GPP because the cell has both of a CSG function and normal accesses (open access). Assume in the present invention that a MR 2200 has such a hybrid function.

When an OP1 terminal (CSG member) 2201 in FIG. 22 is a CSG member for this MR 2200 and an OP1 terminal (non CSG member) 2200 is a non CSG member for this MR 2200, the MR 2200 accepts accesses from both of these terminals. Meanwhile, the MR 2200 performs processing to place priority on the OP terminal 2201 as a CSG member. At this time, if data of the OP1 terminal 2201 and the OP1 terminal 2202 are mixed in a common bearer between the MR 2200 and a DeNB 2203, then it becomes difficult to control to send data of the OP1 terminal 2201 preferentially. Therefore, the processing performed between operators in the first Embodiment is performed herein between a CSG member and a non CSG member.

More specifically, data of each of a CSG member and a non CSG member is divided into corresponding bearers provided between the MR 2200 and the DeNB 2203, so that traffic for CSG members is exchanged using a bearer 1 and traffic for non CSG members is exchanged using a bearer 2. Thereby, scheduling is enabled so that the DeNB 2203 can transmit/receive data on the bearer 1 preferentially.

Herein the operation in the seventh Embodiment may be combined with the first to the sixth Embodiments. For instance, the following operation can be considered.

Operation 1: CSG function is implemented only for main operator (corresponding to Primary PLMN)
OP1 network: CSG members and non CSG members
OP2 network: only non CSG members
High-priority bearer: assigned to CSG members in OP1 network Mid-priority bearer: assigned to non CSG members in OP1 network Low-priority bearer: assigned to OP2 network Note that the mid-priority bearer and the low-priority bearer may be combined.

Operation 2: CSG function is implemented only for operators other than the main operator OP1 network: CSG processing is not performed OP2 network: only CSG members accepted (not Hybrid)

High-priority bearer: OP1 network

Mid-priority bearer: CSG members in OP2 network

Low-priority bearer: not applicable

Operation 3: CSG function is implemented for all operators

OP1 network: CSG processing performed

OP2 network: CSG processing performed

High-priority bearer: CSG members in OP1 network

Mid-priority bearer 1: non CSG members in OP1 network

Mid-priority bearer 2: CSG members in OP2 network

Low-priority bearer: non CSG members in OP2 network

Figure 23:
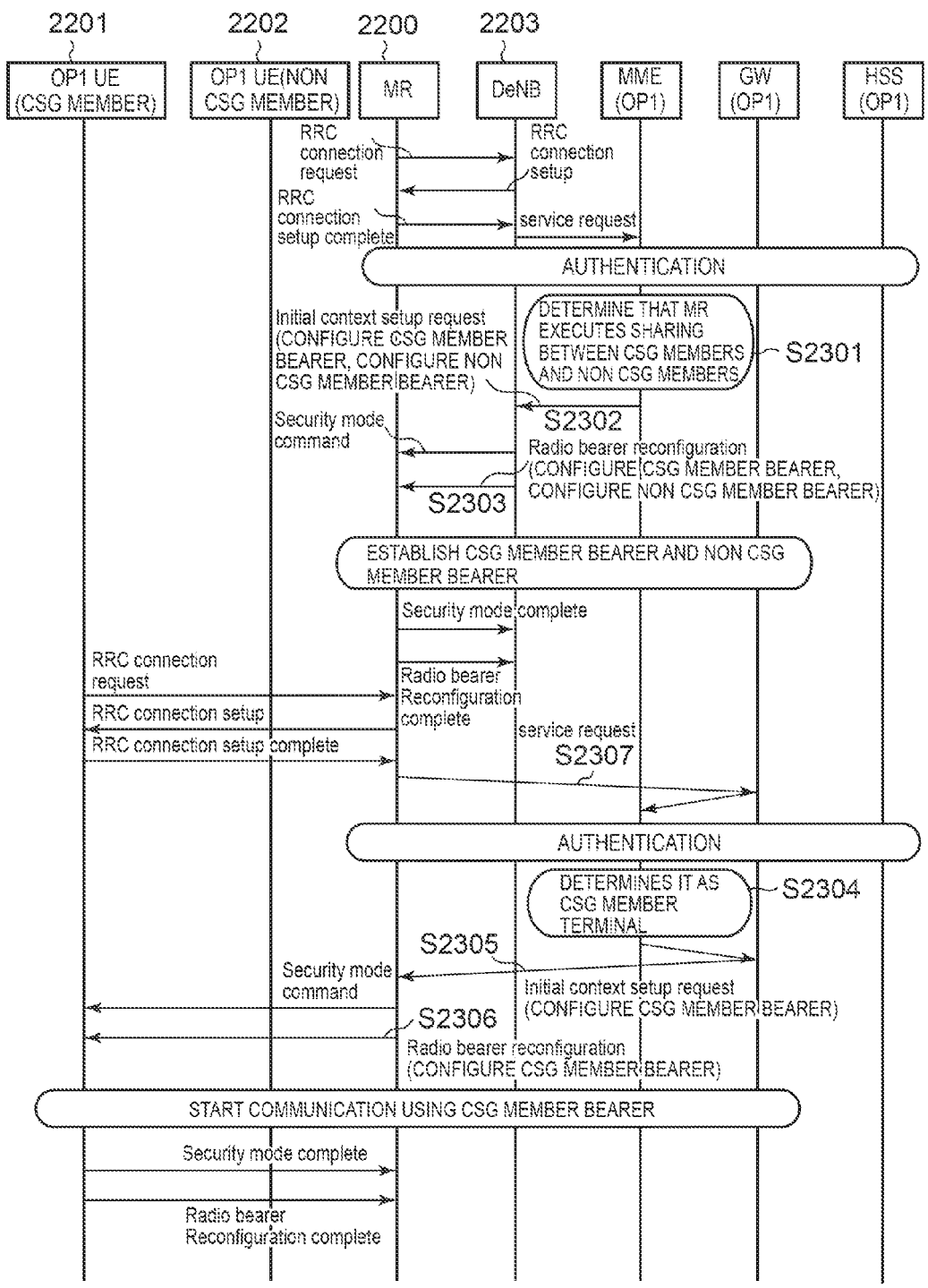
FIG. 23 is a sequence chart showing an exemplary sequence to implement the operation in the seventh Embodiment of the present invention.

FIG. 23 shows procedure to implement this operation. FIG. 23 is based on FIG. 2, and is different from FIG. 2 in that bearers are divided into OP1 bearer and OP2 bearer in FIG. 2, but bearers are divided into CSG members bearer and non CSG members bearer in FIG. 23.

The procedure of FIG. 23 is described on a feature of the procedure different from that in FIG. 2. Firstly, at Step S2301, a MME determines that an MR accommodates a CSG member and a non CSG member, and the MME decides to divide bearers into CSG members bearer and non CSG members bearer. Then at Step S2302, the MME performs such configuration at the DeNB 2203. As a result, at Step S2303, the DeNB 2203 performs the corresponding configuration for the MR 2200. Herein this configuration may indicate information on to which member each bearer belongs.

Next, assume herein the case where the OP1 terminal 2201 connects. In this case, at Step S2304, since it is the OP1 terminal 2201, the MME decides to configure a CSG members bearer. Thereby, at Step S2305, a notification is made to the MR 2200 about the configuration of a CSG members bearer. Thereafter at Step S2306, configuration is performed for the OP1 terminal 2201. Although FIG. 23 shows the case where the OP1 terminal 2201 connects, when the OP1 terminal 2202 connects, the same operation is performed except that a non CSG members bearer is configured.

The seventh Embodiment shows the case that only one bearer is configured for simplification. However, a plurality of bearers may be configured. More specifically, four bearers may be configured for terminals of CSG members so as to provide fine QoS control, and two bearers only may be configured for terminals of non CSG members so as to provide rough QoS control.

Figure 24:
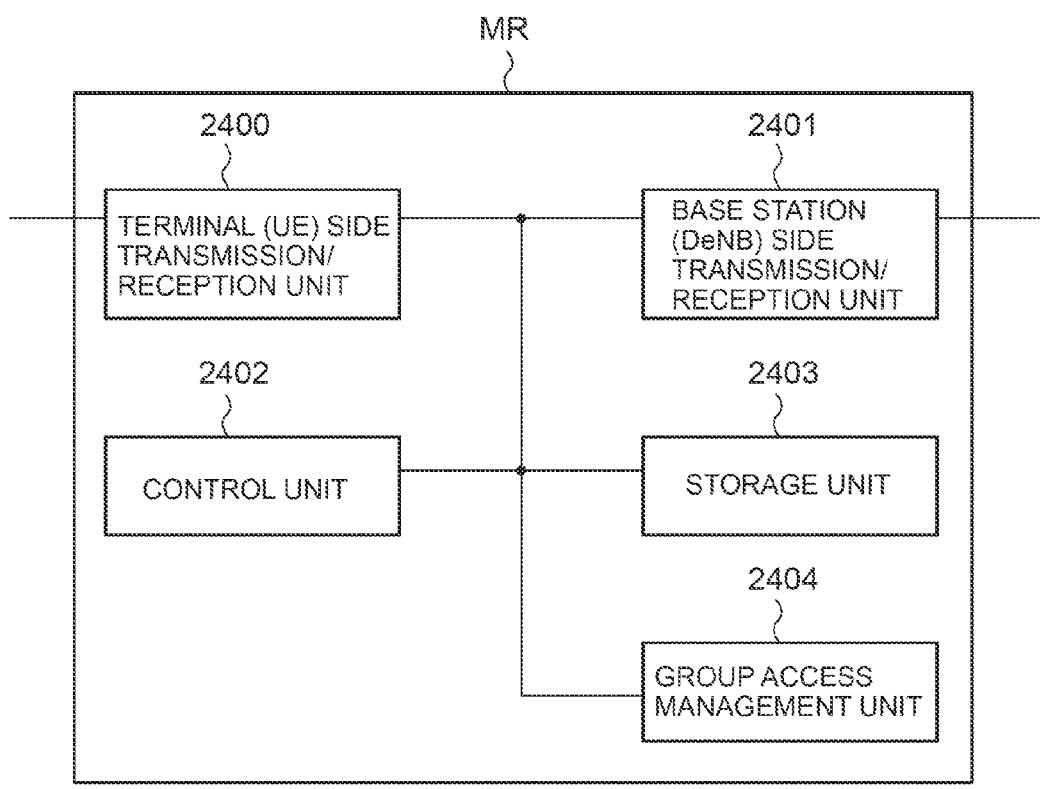
FIG. 24 shows an exemplary configuration of a MR according to the seventh Embodiment of the present invention.

Referring here to FIG. 24, one exemplary configuration of the MR in the seventh Embodiment is described below. As shown in FIG. 24, the MR includes a terminal (UE) side transmission/reception unit 2400, a base station (DeNB) side transmission/reception unit 2401, a control unit 2402, a storage unit 2403 and a group access management unit 2404. The group access management unit 2404 as a feature of the configuration of the MR according to the seventh Embodiment holds information on an access right of a predetermined group of terminals, and manages the accessibility of a terminal to a base station on the basis of the access right. That is, the MR further includes a group access management unit that holds information on an access right of a predetermined group of terminals and manages the accessibility of a terminal to a base station on the basis of the access right, and the MR includes a configuration unit that configures a communication path using information on the access right of the group access management unit as policy information. The group access management unit 2404 corresponds to the CSG management unit in FIG. 22.

Eighth Embodiment

Figure 25:
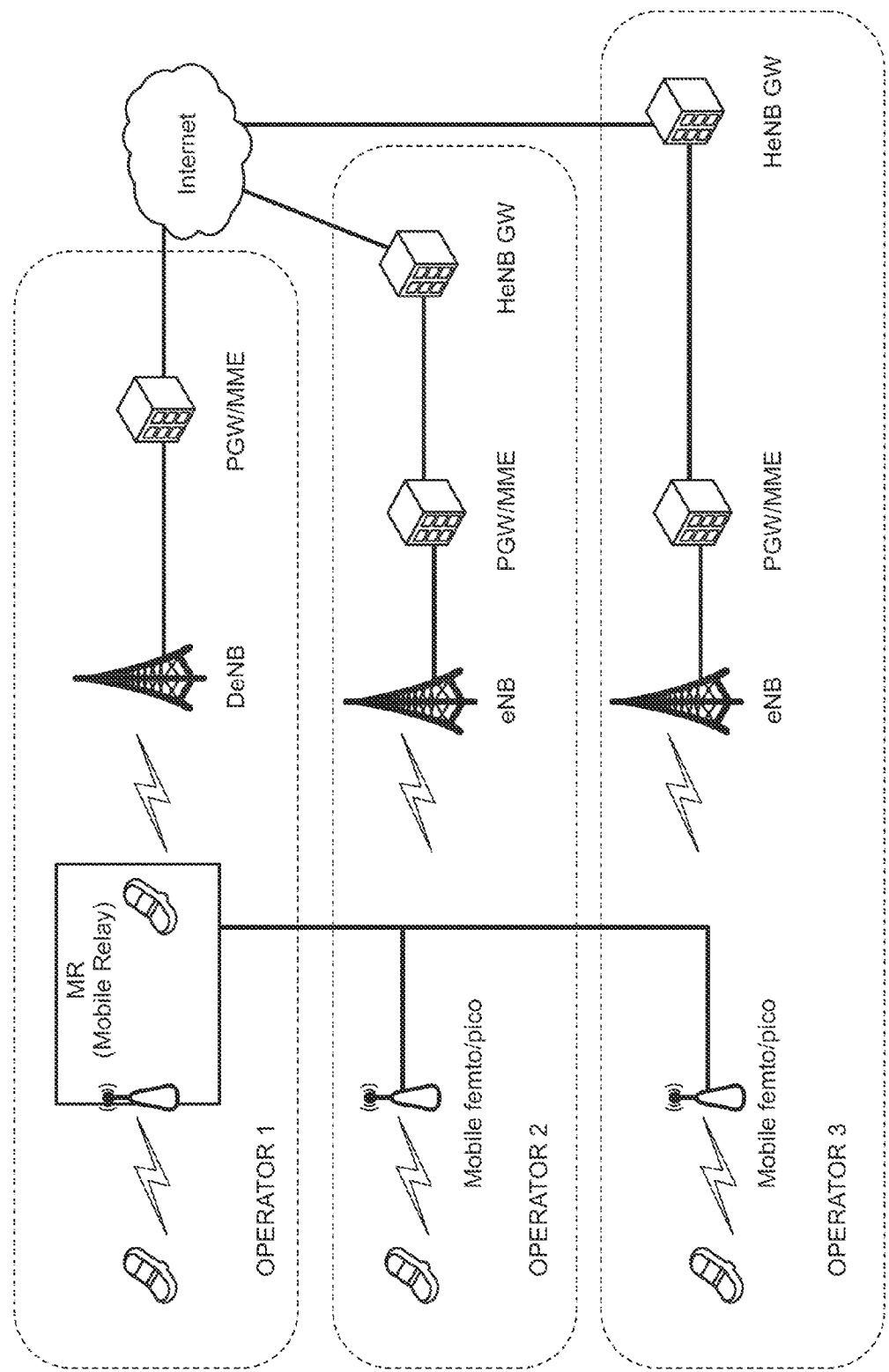
FIG. 25 is a conceptual diagram showing an exemplary configuration in eighth Embodiment of the present invention.

Unlike the first Embodiment, the eighth Embodiment does not use network sharing but provides a service to a terminal at a frequency for each operator as shown in FIG. 25.

This embodiment is the same as the first Embodiment in that only one line for one operator is used between a MR and a DeNB as shown in FIG. 25. On the other hand, the MR provides a cell to each of operator 1, operator 2 and operator 3. More specifically, a frequency that the operator 1 possesses supports between the MR and the DeNB and a terminal selecting the MR subordinate operator 1, a frequency that the operator 2 possesses supports a terminal selecting the MR subordinate operator 2 and the operator 3 is similar to the operator 2.

Figure 26:
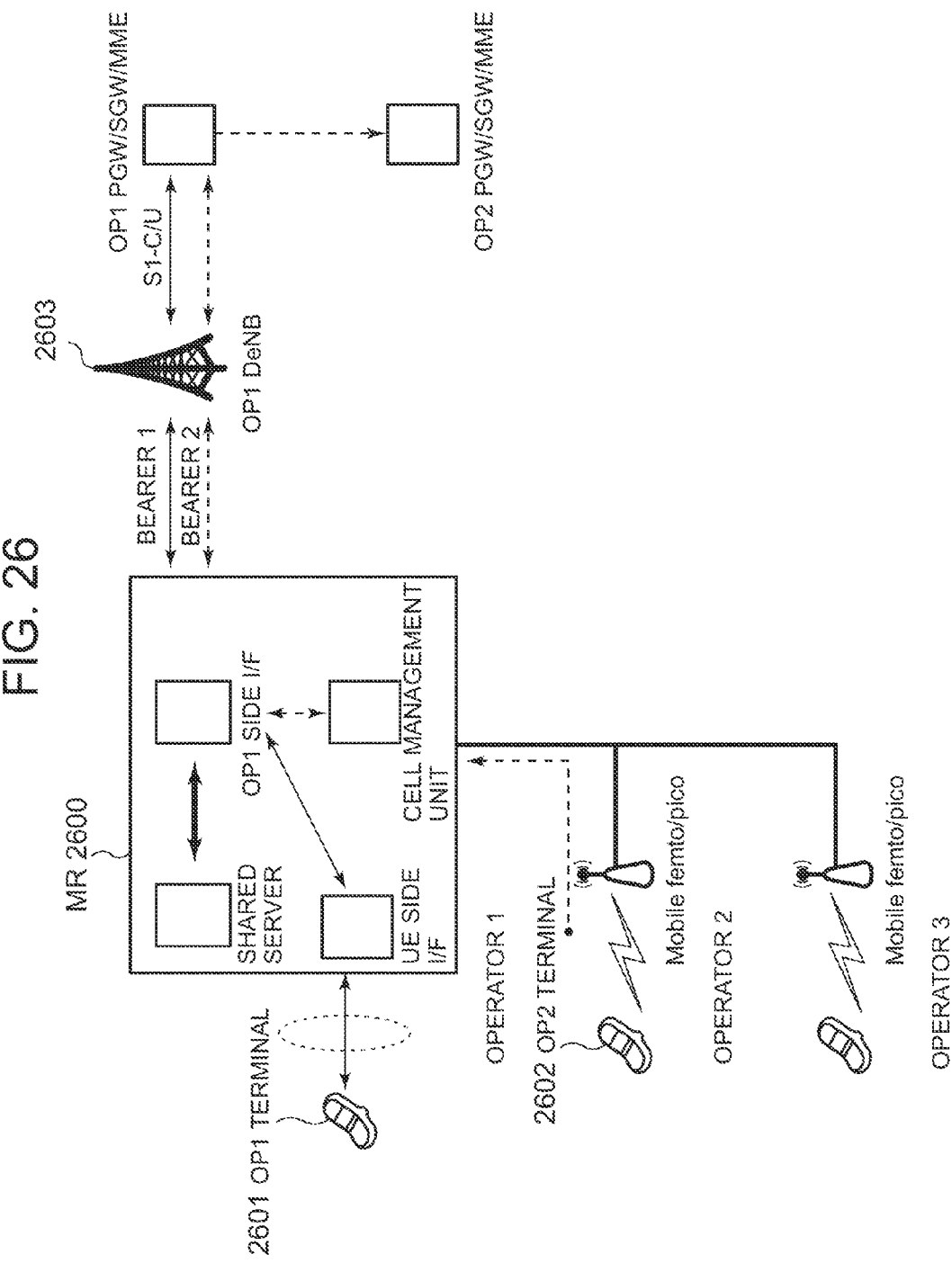
FIG. 26 is a conceptual diagram showing the configuration of a MR in the eighth Embodiment of the present invention.

FIG. 26 is a conceptual diagram showing the configuration of the MR in the eighth Embodiment, and the following describes differences from FIG. 1 only. A MR 2600 includes a UE side I/F that transmits/receives data to be exchanged with a UE (2601) belonging to a cell that the MR 2600 provides as well as a cell management unit that transmits/receives data with a terminal (2602) selecting a frequency that another operator possesses. The MR 2600 makes the UE side I/F and the cell management unit identify a terminal as to to which operator the terminal belongs. Thereby, similarly to the first Embodiment, the MR 2600 configures a bearer between the MR and the DeNB for each operator, and the DeNB can control the amount of data for each operator.

Figure 27:
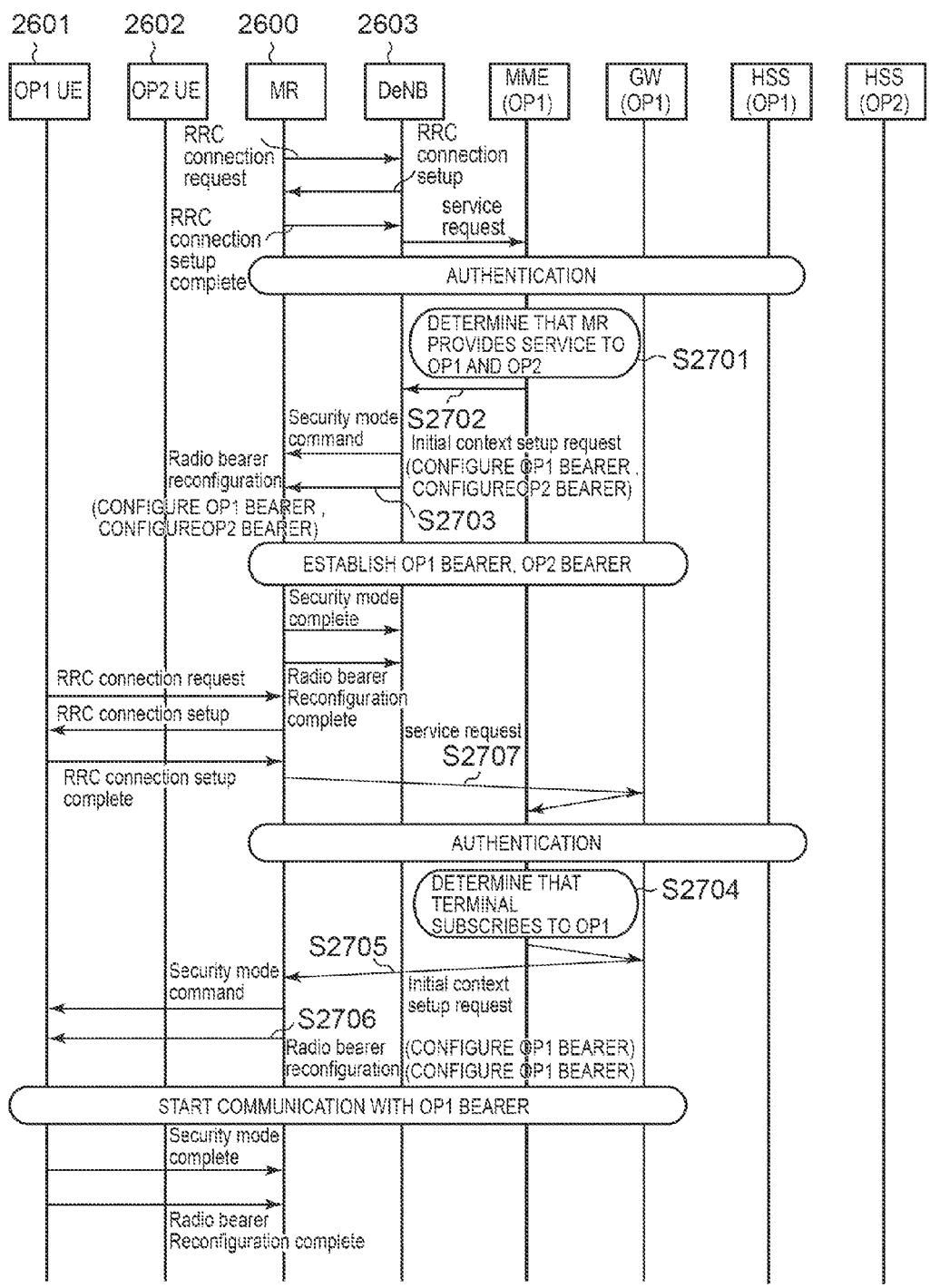
FIG. 27 is a sequence chart showing an exemplary sequence to implement the operation in the eighth Embodiment of the present invention.

FIG. 27 shows an operation procedure in this case. FIG. 27 is based on FIG. 2, and is different from FIG. 2 in that Step S2701 is different from Step S201 so that sharing that is not network sharing is performed. That is, at Step S2701, the MME determines that the MR 2600 provides a service to an OP1 terminal (OP1 UE) 2601 and an OP2 terminal (OP2 UE) 2602, and the MME decides to divide bearers into an OP1 bearer and an OP2 bearer.

Figure 28:
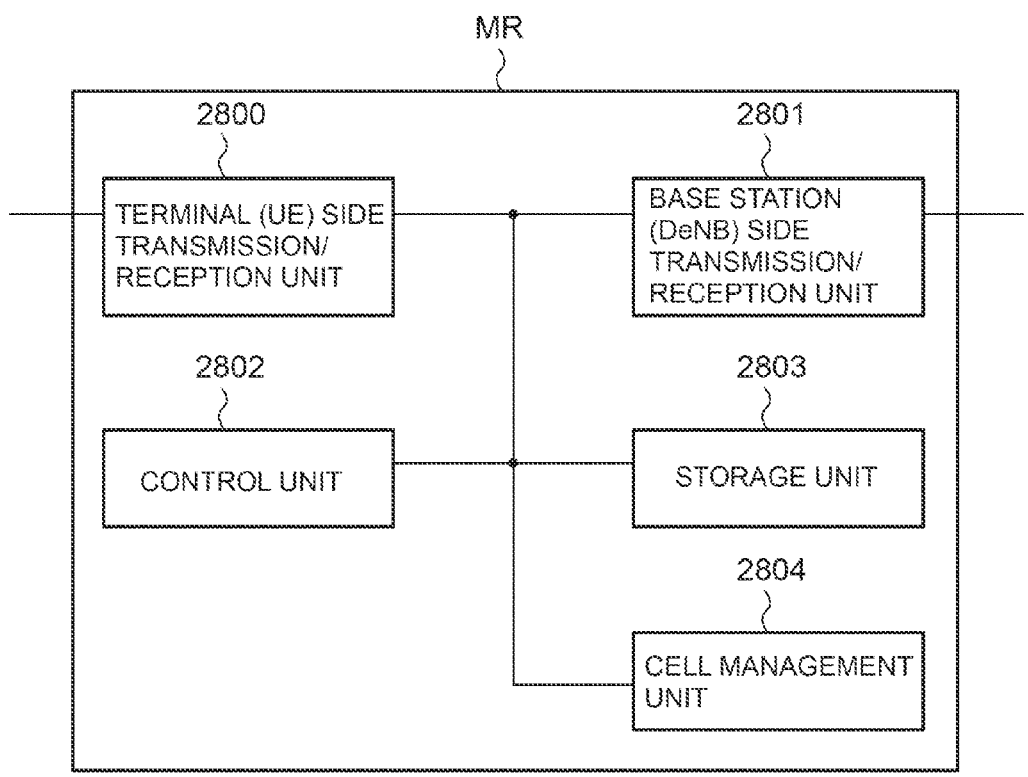
FIG. 28 shows an exemplary configuration of a MR in the eighth Embodiment of the present invention.

Referring here to FIG. 28, one exemplary configuration of the MR in the eighth Embodiment is described below. As shown in FIG. 28, the MR includes a terminal (UE) side transmission/reception unit 2800, a base station (DeNB) side transmission/reception unit 2801, a control unit 2802, a storage unit 2803 and a cell management unit 2804. The cell management unit 2804 as a feature of the configuration of the MR according to the eighth Embodiment provides a plurality of cells different for each operator to a terminal. That is, the MR further includes a cell management unit that provides a plurality of cells different for each operator to a terminal, and the MR includes a configuration unit that configures a communication path using information on a cell to which a mobile terminal connects, the information being acquired by the cell management unit, as policy information.

Figure 29:
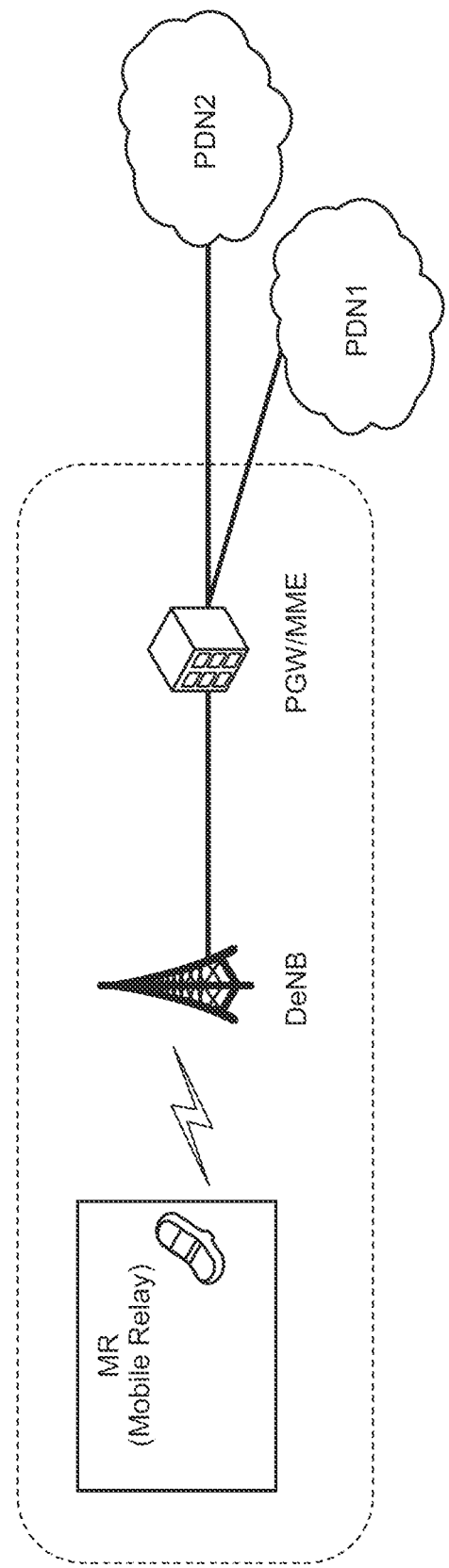
FIG. 29 is a conceptual diagram showing an exemplary configuration where a PDN connection is separately provided in the eighth Embodiment of the present invention.
Figure 30:
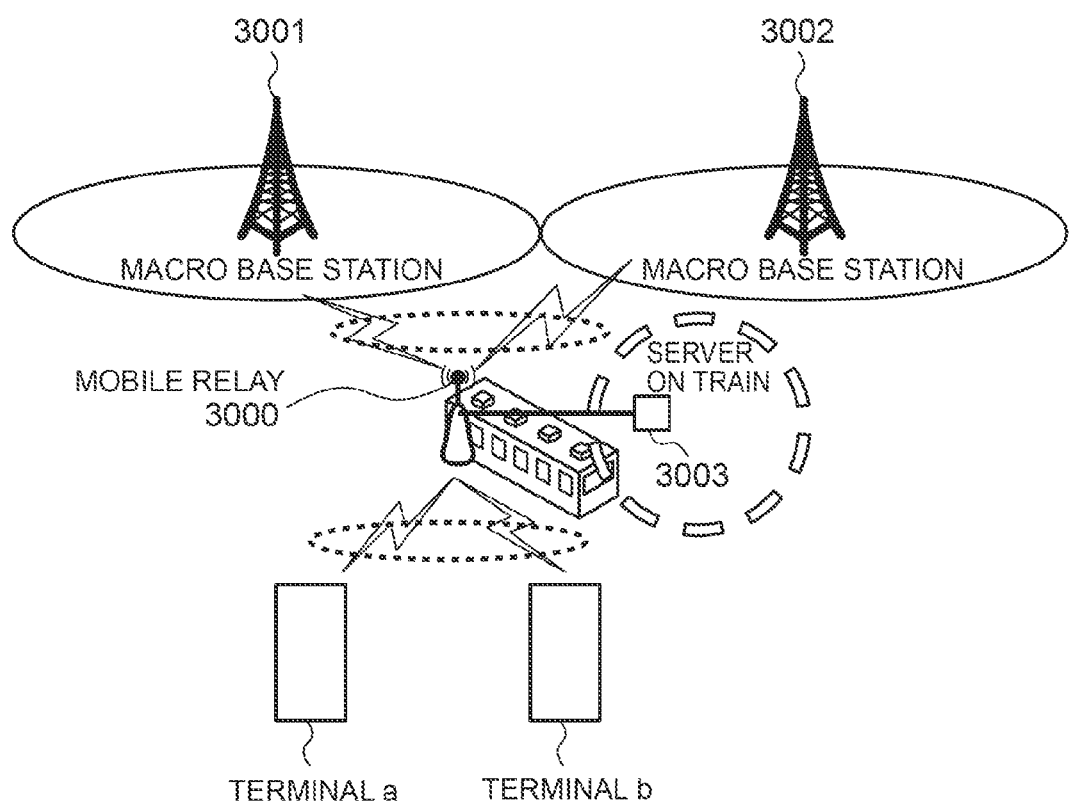
FIG. 30 describes a conventional mobile relay.
Figure 31:
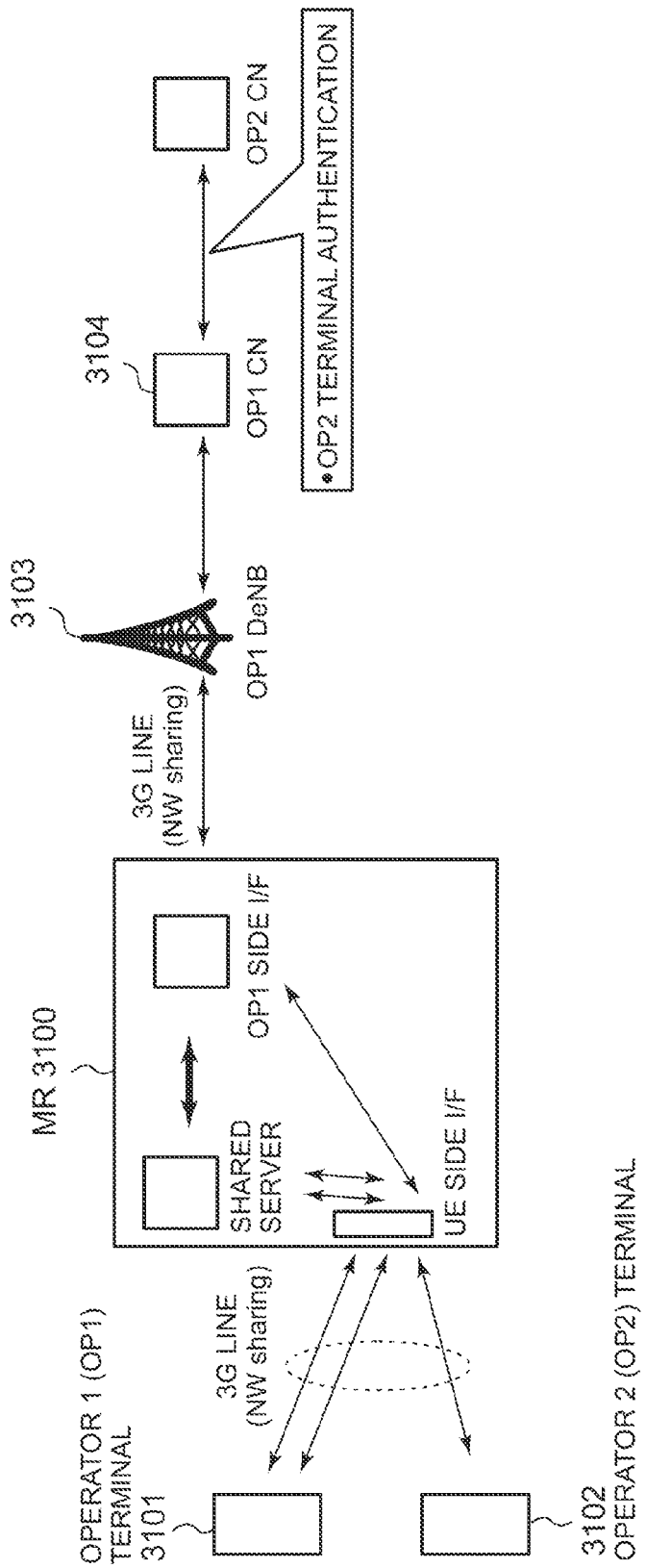
FIG. 31 describes network sharing using a conventional mobile relay.

Herein, not only a bearer but also a connection between a Packet Gateway and a terminal called a PDN (Packet Data Network) connection may be separately configured between operators. FIG. 29 shows this concept. In this way, a plurality of PDNs are prepared, and a different PDN is used for each operator, whereby processing depending on to each PDN state is enabled. More specifically, the congestion state of each PDN can be reflected.

Note here that although all techniques used in the eighth Embodiment relates to cellular techniques, a technique other than the cellular such as wireless LAN may be applied to the present method. For instance, in FIG. 25, not a cellular base station such as a Mobile femto/pico but a function of wireless LAN may be provided as the operator 2, so as to implement supporting of a terminal subscribing to the operator 2. Further, among the operator 1, a terminal in communication by cellular and a terminal accessing by wireless LAN may be divided, whereby not only frequencies for cellular but also an ISM band that the wireless LAN uses can be used, and so more terminals can be accommodated. At this time, the terminal connecting using a cellular function and the terminal connecting using wireless LAN can be controlled while assigning a different bearer between the MR and the DeNB thereto. For instance, interference can be controlled better and finer QoS can be realized in the case of cellular used than in the case of using wireless LAN. Therefore, in a possible operation, a bearer for a terminal connecting using a cellular function can be controlled while considering QoS thereof more.

Each functional block used in the description of the above-stated embodiments may be typically implemented as a LSI (Large Scale Integration) that is an integrated circuit. These blocks may be individually configured as one chip, or one chip may include a part or all of the functional blocks. LSIs may be called an IC (Integrated Circuit), a system LSI, a super LSI, and an ultra LSI depending on the degree of integration. A technique for integrated circuit is not limited to a LSI, but an integrated circuit may be achieved using a dedicated circuit or a general-purpose processor. A FPGA (Field Programmable Gate Array) capable of programming after manufacturing a LSI and a reconfigurable processor capable of reconfiguring connection and setting of a circuit cell inside a LSI may be used. Further, if a technique for integrated circuit that replaces LSIs becomes available with the development of a semiconductor technique or derived techniques, functional blocks may be naturally integrated using such a technique. For instance, biotechnology may be applied thereto.

INDUSTRIAL APPLICABILITY

A base station and a communication system of the present invention allow traffic to be flexibly distributed for terminals of a plurality of network sharing operators, and therefore they are effective for a base station that relays a communication between a mobile terminal and a correspondent node of the mobile terminal and a communication system including a mobile terminal and a base station.

The invention claimed is:

1. A base station to which a plurality of mobile terminals connect and that relays a communication between a communication device as a correspondent node of the plurality of mobile terminals and the plurality of mobile terminals, comprising:
a configuration unit that configures, on a basis of policy information, a first communication path between the mobile terminals and the communication device, and a second communication path from the base station itself to a gateway managing an access to a network to which the communication device belongs; and
a storage unit that stores in a storage area, as association information, content of the policy information and identification information that identifies a communication path between the first communication path and the second communication path corresponding to the stored content.

2. The base station according to claim 1, further comprising:
a reception unit that receives a data packet from the mobile terminals; and
a selection unit that selects, on a basis of the stored association information, the communication path between the first communication path and the second communication path, through which the received data packet is to be transmitted.

3. The base station according to claim 1, wherein the mobile terminals belong to different communication operators, and the communication device includes a plurality of communication devices corresponding to the different communication operators.

4. The base station according to claim 1, wherein the configuration unit further includes a function to configure a third communication path for internal access between the mobile terminals and the base station, and wherein
a communication for an access from the mobile terminals to a service provided by the base station is made by using the third communication path for internal access.

5. A base station to which a plurality of mobile terminals connect and that relays a communication between a communication device as a correspondent node of the plurality of mobile terminals and the plurality of mobile terminals, comprising:
a configuration unit that configures, on a basis of policy information, a first communication path between the mobile terminals and the communication device, and a second communication path from the base station itself to a gateway managing an access to a network to which the communication device belongs;
a storage unit that stores in a storage area, as association information, content of the policy information and identification information that identifies a communication path corresponding to the content;
a plurality of wireless connection interfaces connecting to a network of communication operators; and
a quality measurement unit that measures a communication quality of the plurality of wireless connection interfaces,
wherein the configuration unit further includes a function to change the communication path on a basis of a measurement result measured by the quality measurement unit.

6. The base station according to claim 5, further comprising: a cell management unit that provides a plurality of different cell for each operator to the mobile terminals, wherein
the configuration unit configures the communication path by using information on a cell to which the mobile terminals connects, the information being acquired by the cell management unit, as the policy information, and
wherein the mobile terminals belong to different communication operators, and the communication device includes a plurality of communication devices corresponding to the different communication operators.

7. A base station to which a plurality of mobile terminals connect and that relays a communication between a communication device as a correspondent node of the plurality of mobile terminals and the plurality of mobile terminals, comprising:
a configuration unit that configures, on a basis of policy information, a first communication path between the mobile terminals and the communication device, and a second communication path from the base station itself to a gateway managing an access to a network to which the communication device belongs;
a storage unit that stores in a storage area, as association information, content of the policy information and identification information that identifies a communication path corresponding to the content; and a group access management unit that holds information on an access right of a predetermined group of the mobile terminals and manages accessibility of the mobile terminals to the base station on a basis of the access right, wherein the configuration unit configures the communication path by using information on the access right of the group access management unit as policy information.

8. A communication system comprising: a plurality of mobile terminals belonging to different communication operators; and a base station that is connected by the plurality of mobile terminals and relays a communication between a plurality of communication devices that are correspondent nodes of the plurality of mobile terminals and corresponding to the different communication operators and the plurality of mobile terminals, wherein
a management device that performs mobile management of each mobile terminal selects, on a basis of policy information to configure a first communication path between the mobile terminal and the corresponding communication device, a gateway located at the other end of a second communication path from the base station satisfying the policy information, the gateway managing an access to a network to which the communication device belongs, and the base station configures the second communication path from the base station itself to the selected gateway on a basis of the policy information, and stores, as association information, content of the policy information and identification information to identify a communication path between the first communication path and the second communication path corresponding to the stored content.

9. The communication system according to claim 8, wherein when the base station receives a data packet from the mobile terminal, the base station selects a communication path between the first communication path and the second communication path, through which the received data packet is to be transmitted on a basis of the stored association information.

10. A communication system comprising: a plurality of mobile terminals belonging to different communication operators; and a base station that is connected by the plurality of mobile terminals and relays a communication between a plurality of communication devices that are correspondent nodes of the plurality of mobile terminals and corresponding to the different communication operators and the plurality of mobile terminals, wherein
a management device that performs mobile management of each mobile terminal selects, on a basis of policy information to configure a first communication path between the mobile terminal and the corresponding communication device, a gateway located at the other end of a second communication path from the base station satisfying the policy information, the gateway managing an access to a network to which the communication device belongs, and the base station configures the second communication path from the base station itself to the selected gateway on a basis of the policy information, and stores, as association information, content of the policy information and identification information to identify a communication path corresponding to the content in a storage area, and wherein the management device selects the gateway in accordance with priority of traffic of the communication.

11. The communication system according to claim 10, wherein when selecting the gateway, the management device selects the gateway having a function that the management device has.

12. The communication system according to claim 11, wherein the selected gateway performs authentication processing of the mobile terminal to connect via the management device in accordance with priority of traffic of the communication.

* * * * *